US012784385B2

(12) United States Patent
Burr et al.

(10) Patent No.: US 12,784,385 B2
(45) Date of Patent: Nov. 3, 2026

(54) AUTOMATIC FITTING AND TAILORING FOR STYLIZED AVATARS

(71) Applicant: Roblox Corporation, San Mateo, CA (US)

(72) Inventors: Adam Tucker Burr, Suffern, NY (US); Lauren Go, San Mateo, CA (US); Rachel Yamada, San Mateo, CA (US); Ronen Shaham, San Mateo, CA (US)

(73) Assignee: Roblox Corporation

( * ) Notice: Subject to any disclaimer, the term of this patent is extended or adjusted under 35 U.S.C. 154(b) by 114 days.

(21) Appl. No.: 18/798,227

(22) Filed: Aug. 8, 2024

(65) Prior Publication Data

US 2025/0054257 A1 Feb. 13, 2025

Related U.S. Application Data

(60) Provisional application No. 63/531,885, filed on Aug. 10, 2023.

(51) Int. Cl.
*G06T 19/20* (2011.01)

(52) U.S. Cl.
CPC .................................... *G06T 19/20* (2013.01)

(58) Field of Classification Search
None
See application file for complete search history.

(56) References Cited

U.S. PATENT DOCUMENTS

| | | | | |
|---|---|---|---|---|
| 12,412,342 | B2 * | 9/2025 | Kaufman | G06T 19/20 |
| 2015/0003690 | A1 * | 1/2015 | Masuko | G06T 3/40 382/111 |
| 2021/0375067 | A1 * | 12/2021 | Grant | G06T 13/40 |

* cited by examiner

*Primary Examiner* — Yanna Wu
(74) *Attorney, Agent, or Firm* — IP Spring

(57) ABSTRACT

Some implementations relate to methods, systems, and computer-readable media to fit a clothing item onto an avatar body in a three-dimensional environment. To obtain a more tailored/precise fitting, dimensions of the clothing item are constrained according to various reference dimensions. A reference region for the avatar body is identified along with a reference dimension. A first region of a clothing item is identified, the first region having a first dimension. At least one second dimension of the clothing item is identified, and at least one first relationship between the first dimension and the second dimension is determined. The first dimension is changed to correspond to the reference dimension and the at least one second dimension is changed to scale the clothing item along the at least one second dimension, wherein the at least one first relationship is maintained after the changing of the at least one second dimension.

17 Claims, 19 Drawing Sheets

802

800

900

1000

1600

1800

1804

1802

1900

1902

1904

AUTOMATIC FITTING AND TAILORING FOR STYLIZED AVATARS

CROSS-REFERENCE TO RELATED APPLICATIONS

This application claims priority to U.S. Provisional Application No. 63/531,885, entitled "AUTOMATIC FITTING AND TAILORING FOR STYLIZED AVATARS," filed on Aug. 10, 2023, the content of which is incorporated herein in its entirety.

TECHNICAL FIELD

This disclosure relates generally to computer graphics, and more particularly but not exclusively, relates to methods, systems, and computer readable media to provide graphical representations of clothing over an underlying graphical object, such as layered clothing for three-dimensional (3D) avatars in a virtual experience.

BACKGROUND

Multi-user electronic gaming or other types of virtual experience environments may involve the use of avatars, which represent the users in the virtual experience. Different three-dimensional (3D) avatars differ in geometry/shapes from one avatar to another. For example, avatars may have different body shapes (e.g., tall, short, muscular, thin, etc.), may be of different types (e.g., male, female, human, animal, alien, etc.), may have any number and types of limbs, etc. Avatars may be customizable with multiple pieces of clothing and/or accessories worn by the avatar (e.g., shirt worn over the torso, jacket worn over the shirt, scarf worn over the jacket, hat worn over the head, etc.).

It may be difficult to obtain satisfactory visual results, in a computationally efficient manner, when layering or otherwise fitting pieces of clothing onto an avatar.

Some implementations were conceived in light of the above.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

Implementations of the present disclosure relate to fitting clothing onto three-dimensional (3D) avatars. For example, the fitting uses a variety of techniques to obtain high quality results while minimizing human labor and computational resources. As an example, the fitting may fit shoes onto an avatar with improved visual quality. For example, the techniques may include identifying a reference region, determining a reference dimension of the reference region, identifying a first region of a clothing item to be fitted, identifying at least one second dimension of the clothing item, identifying a relationship between the dimensions, changing the first dimension to correspond to the reference dimension, and changing the at least one dimension of the clothing item to scale the clothing item along the at least one second dimension.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

According to one aspect, a computer-implemented method to provide fitted clothing on three-dimensional (3D) avatars is provided, the method comprising: identifying a reference region of an avatar body of an avatar; determining a reference dimension of the reference region of the avatar body; identifying a first region of a clothing item that is to be fitted to the reference region of the avatar body, wherein the first region has a first dimension; identifying at least one second dimension of the clothing item; determining at least one first relationship between the first dimension and the at least one second dimension; changing the first dimension to correspond to the reference dimension of the reference region of the avatar body so as to fit the first region of the clothing item to the reference region of the avatar body, wherein changing the first dimension correspondingly causes a scaling in size of the clothing item; and changing the at least one second dimension of the clothing item to scale the clothing item along the at least one second dimension, wherein the at least one first relationship between the first dimension and the at least one second dimension is maintained after completion of the changing of the at least one second dimension.

Various implementations of the computer-implemented method are described herein.

In some implementations, the clothing item comprises a shoe.

In some implementations, identifying the reference region of the avatar body comprises identifying an ankle of the avatar body, determining the reference dimension of the reference region of the avatar body comprises determining a diagonal of the ankle, identifying the first region of the clothing item that is to be fitted to the reference region of the avatar body comprises identifying a mouth of the shoe that is to be fitted to the ankle of the avatar body, wherein the first dimension comprises a diagonal of the mouth of the shoe, identifying the at least one second dimension of the clothing item comprises identifying a height of the shoe, determining the at least one first relationship between the first dimension and the at least one second dimension comprises determining a ratio between the diagonal of the mouth of the shoe and the height of the shoe, changing the first dimension to correspond to the reference dimension of the reference region of the avatar body comprises changing the diagonal of the mouth of the shoe to match the diagonal of the ankle, and changing the at least one second dimension of the clothing item to scale the clothing item along the at least the second dimension comprises changing the height of the shoe.

In some implementations, identifying the at least one second dimension of the clothing item further comprises identifying a toe length of the shoe, determining the at least one first relationship further comprises determining a ratio between the toe length of the shoe and the height of the shoe, and changing the at least one second dimension of the clothing item to scale the clothing item along the at least the second dimension comprises changing the toe length, wherein the ratio between the toe length of the shoe and the height of the shoe is maintained after completion of the changing of the toe length.

In some implementations, the computer-implemented method further comprises performing a tapering of a toe of the shoe, wherein the tapering is based at least in part on an original toe length and an original width of the shoe prior to changing the first dimension and changing the at least one second dimension.

In some implementations, the at least one first relationship comprises a ratio between the first dimension and the at least one second dimension, the ratio being within a predetermined range of values.

In some implementations, changing the first dimension and the at least the second dimension of the clothing item comprises modifying a cage of the clothing item.

According to another aspect, a non-transitory computer-readable medium is provided. The non-transitory computer-readable medium with instructions stored thereon that, responsive to execution by a processing device, causes the processing device to perform operations comprising: identifying a reference region of an avatar body of an avatar; determining a reference dimension of the reference region of the avatar body; identifying a first region of a clothing item that is to be fitted to the reference region of the avatar body, wherein the first region has a first dimension; identifying at least one second dimension of the clothing item; determining at least one first relationship between the first dimension and the at least one second dimension; changing the first dimension to correspond to the reference dimension of the reference region of the avatar body so as to fit the first region of the clothing item to the reference region of the avatar body, wherein changing the first dimension correspondingly causes a scaling in size of the clothing item; and changing the at least one second dimension of the clothing item to scale the clothing item along the at least one second dimension, wherein the at least one first relationship between the first dimension and the at least one second dimension is maintained after completion of the changing of the at least one second dimension.

Various implementations of the non-transitory computer-readable medium are described herein.

In some implementations, the clothing item comprises a shoe.

In some implementations, identifying the reference region of the avatar body comprises identifying an ankle of the avatar body, determining the reference dimension of the reference region of the avatar body comprises determining a diagonal of the ankle, identifying the first region of the clothing item that is to be fitted to the reference region of the avatar body comprises identifying a mouth of the shoe that is to be fitted to the ankle of the avatar body, wherein the first dimension comprises a diagonal of the mouth of the shoe, identifying the at least one second dimension of the clothing item comprises identifying a height of the shoe, determining the at least one first relationship between the first dimension and the at least one second dimension comprises determining a ratio between the diagonal of the mouth of the shoe and the height of the shoe, changing the first dimension to correspond to the reference dimension of the reference region of the avatar body comprises changing the diagonal of the mouth of the shoe to match the diagonal of the ankle, and changing the at least one second dimension of the clothing item to scale the clothing item along the at least the second dimension comprises changing the height of the shoe.

In some implementations, identifying the at least one second dimension of the clothing item further comprises identifying a toe length of the shoe, determining the at least one first relationship further comprises determining a ratio between the toe length of the shoe and the height of the shoe, and changing the at least one second dimension of the clothing item to scale the clothing item along the at least the second dimension comprises changing the toe length, wherein the ratio between the toe length of the shoe and the height of the shoe is maintained after completion of the changing of the toe length.

In some implementations, the operations further comprise performing a tapering of a toe of the shoe, wherein the tapering is based at least in part on an original toe length and an original width of the shoe prior to changing the first dimension and changing the at least one second dimension.

In some implementations, the at least one first relationship comprises a ratio between the first dimension and the at least one second dimension, the ratio being within a predetermined range of values.

In some implementations, changing the first dimension and the at least the second dimension of the clothing item comprises modifying a cage of the clothing item.

According to another aspect, a system is disclosed, comprising: a memory with instructions stored thereon; and a processing device, coupled to the memory, the processing device configured to access the memory, wherein the instructions when executed by the processing device cause the processing device to perform operations including: identifying a reference region of an avatar body of an avatar; determining a reference dimension of the reference region of the avatar body; identifying a first region of a clothing item that is to be fitted to the reference region of the avatar body, wherein the first region has a first dimension; identifying at least one second dimension of the clothing item; determining at least one first relationship between the first dimension and the at least one second dimension; changing the first dimension to correspond to the reference dimension of the reference region of the avatar body so as to fit the first region of the clothing item to the reference region of the avatar body, wherein changing the first dimension correspondingly causes a scaling in size of the clothing item; and changing the at least one second dimension of the clothing item to scale the clothing item along the at least one second dimension, wherein the at least one first relationship between the first dimension and the at least one second dimension is maintained after completion of the changing of the at least one second dimension.

Various implementations of the system are described herein.

In some implementations, the clothing item comprises a shoe.

In some implementations, identifying the reference region of the avatar body comprises identifying an ankle of the avatar body, determining the reference dimension of the reference region of the avatar body comprises determining a diagonal of the ankle, identifying the first region of the clothing item that is to be fitted to the reference region of the avatar body comprises identifying a mouth of the shoe that is to be fitted to the ankle of the avatar body, wherein the first dimension comprises a diagonal of the mouth of the shoe, identifying the at least one second dimension of the clothing item comprises identifying a height of the shoe, determining the at least one first relationship between the first dimension and the at least one second dimension comprises determining a ratio between the diagonal of the mouth of the shoe and the height of the shoe, changing the first dimension to correspond to the reference dimension of the reference region of the avatar body comprises changing the diagonal of the mouth of the shoe to match the diagonal of the ankle, and changing the at least one second dimension of the clothing item to scale the clothing item along the at least the second dimension comprises changing the height of the shoe.

In some implementations, identifying the at least one second dimension of the clothing item further comprises identifying a toe length of the shoe, determining the at least one first relationship further comprises determining a ratio between the toe length of the shoe and the height of the shoe, and changing the at least one second dimension of the clothing item to scale the clothing item along the at least the second dimension comprises changing the toe length, wherein the ratio between the toe length of the shoe and the height of the shoe is maintained after completion of the changing of the toe length.

In some implementations, the operations further comprise performing a tapering of a toe of the shoe, wherein the tapering is based at least in part on an original toe length and an original width of the shoe prior to changing the first dimension and changing the at least one second dimension.

In some implementations, the at least one first relationship comprises a ratio between the first dimension and the at least one second dimension, the ratio being within a predetermined range of values.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

DETAILED DESCRIPTION

Figure 1:
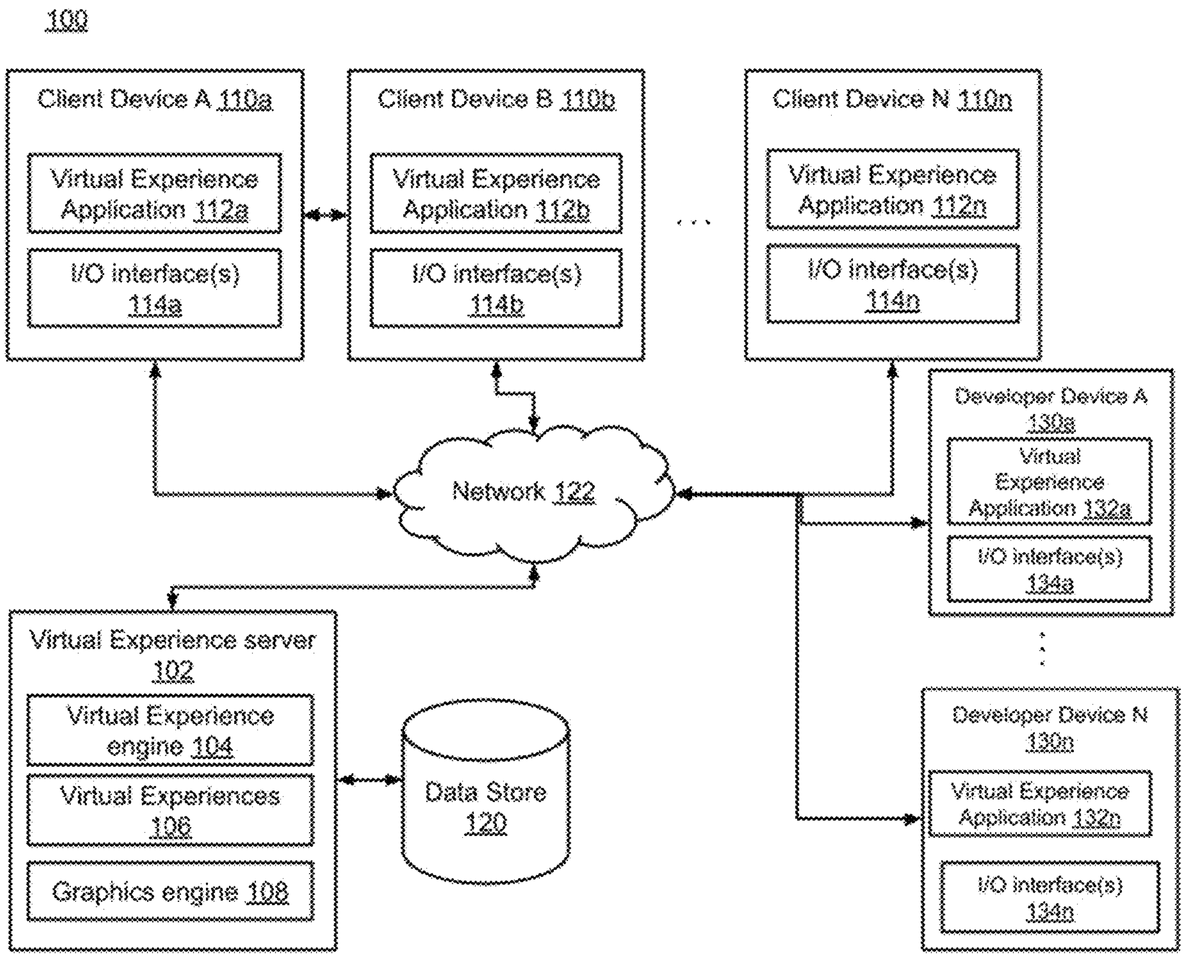
FIG. 1 is a diagram of an example system architecture that includes a 3D environment platform that can support 3D avatars with clothing fitted thereon, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the figures, can be arranged, substituted, combined, separated, and designed in a wide variety of different configurations, all of which are contemplated herein.

References in the specification to "some implementations," "an implementation," "an example implementation," etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

The present disclosure describes techniques to automatically fit clothing items onto an avatar, such as fitting a clothing item over a body part of the avatar and/or over an underlying piece of clothing being worn by the avatar (e.g., so as to provide layered clothing). In this manner, precisely fitted clothing item(s) are tailored for the avatar, thereby giving the avatar a more stylized appearance.

The fitting (including tailoring) techniques may be applied to avatars that are used in a virtual experience. Such virtual experiences are sometimes described herein in the context of an electronic game. It is understood that such implementations described in the context of electronic games are for purposes of convenience in providing examples and illustrations.

The fitting techniques described herein can be used for other types of virtual experiences in a three-dimensional (3D) environment that may not necessarily involve an electronic game having one or more players represented by avatars. Examples of virtual experiences may include a virtual reality (VR) conference, a 3D session (e.g., an online lecture or other type of presentation involving 3D avatars), an augmented reality (AR) session, or in other types of 3D environments in which one or more users are represented in the 3D environment by one or more 3D avatars.

With layered clothing, an automated cage-to-cage fitting technique may be used for 3D avatars. The technique allows any body geometry to be fitted with any clothing geometry, including enabling layers of clothing to be fitted over underlying layer(s) of clothing, thereby providing customization without the limits imposed by pre-defined geometries, or requiring complex computations to make a clothing item compatible with arbitrary body shapes of avatars or other clothing items.

The cage-to-cage fitting may also be performed automatically by a gaming platform or gaming software (or other virtual experience platform/software that operates to provide a 3D environment), without requiring avatar creators (also referred to as avatar body creators, or body creators) or clothing item creators to perform complex computations. The terms "clothing" or "piece of clothing" or other analogous terminology used herein are understood to include graphical representations of clothing and accessories, and any other item that can be placed on an avatar in relation to specific parts of an avatar cage.

At runtime during a game or other virtual experience session, a player/user accesses a body library to select a particular avatar body and accesses a clothing library to select pieces of clothing to place on the selected body. A 3D environment platform that presents avatars implements the cage-to-cage fitting techniques to adjust (by suitable deformations, determined automatically) a piece of clothing to conform to the shape of the body, thereby automatically fitting the piece of clothing onto the body (and any intermediate layers, if worn by the avatar).

When the piece of clothing is fitted over the body and/or underlying piece of clothing, the techniques described herein may be performed to deform or otherwise fit the piece of clothing more precisely to the avatar, such as in terms of scale (e.g., proportionality), shape, etc. The user may further select an additional piece of clothing to fit over an underlying piece of clothing, with the additional piece of clothing being deformed to match the geometry of the underlying piece of clothing.

The implementations described herein are based on the concept of "cages" and "meshes." A body "mesh" (or "render mesh") is the actual visible geometry of an avatar. A body "mesh" includes graphical representations of body parts such as arms, legs, torso, head parts, etc. and may be of arbitrary shape, size, and geometric topology. Analogously, a clothing "mesh" (or "render mesh") may be any arbitrary mesh that graphically represents a piece of clothing, such as a shirt, pants, hat, shoes, etc. or parts thereof.

By comparison, a "cage" represents an envelope of features points around the avatar body that is simpler than the body mesh and has weak correspondence to the corresponding vertices of the body mesh. As is explained in further detail later below, a cage may also be used to represent not only the set of feature points on an avatar body, but also a set of feature points on a piece of clothing.

FIG. 1—System Architecture

FIG. 1 is a diagram of an example system architecture that includes a 3D environment platform that can support 3D avatars with clothing fitted thereon, in accordance with some implementations.

FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowcharts shown in FIGS. 20, 21, and 22. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be a virtual gaming server. For example, the gaming server may provide single-player or multiplayer games to a community of users that may access as "system" herein) includes online virtual experience server 102, data store 120, client or interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of an environment may be a three-dimensional (3D) environment. The one or more environments of a virtual experience 106 may be collectively referred to as a "world" or "virtual experience world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experiences 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine/application (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the experience instructions and render the virtual experience for presentation on the displays of client devices 110.

In some implementations, the control instructions may refer to instructions that are indicative of actions of a user's character within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to developer device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the developer device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, that are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (APIs), and thus is not limited to use in websites.

Figure 2:
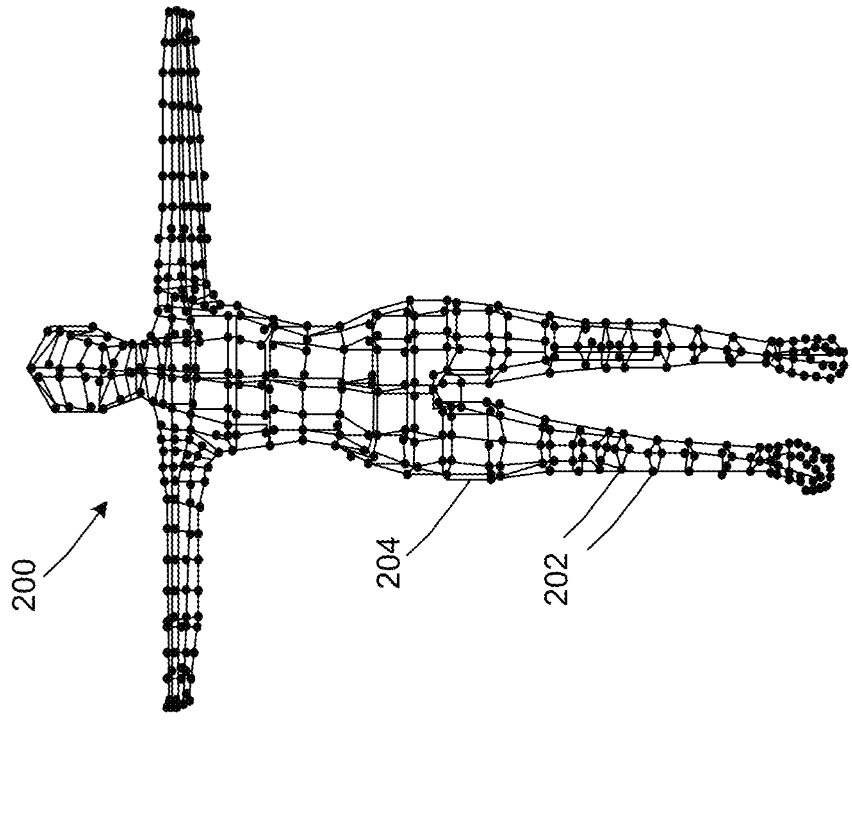
FIG. 2 illustrates an example body cage, in accordance with some implementations.

FIG. 2—Example Body Cage

FIG. 2 illustrates an example body cage 200, in accordance with some implementations. The body cage 200 in the example of FIG. 2 is an outer cage that envelopes or is superimposed on the external surface/contours of a humanoid body shape that acts as a mannequin. The underlying humanoid body shape (mannequin, not shown), which is enveloped by the body cage 200, may be represented by or comprised of a body mesh that includes multiple polygons and their vertices. The polygons of the body mesh (as well as those of a clothing mesh) may be triangles, with the surface area of each triangle providing a "face" or "mesh face."

The body cage 200 comprises a plurality of feature points 202 that define or otherwise identify or correspond to the shape of the mannequin. In some implementations, the feature points 202 are formed by the vertices of segments/sides 204 of multiple polygons (or other geometric shape) on the mannequin. According to various implementations (and although not depicted as such in FIG. 2), the polygons may be triangles, with the surface area of each triangle providing a "face" or "cage face." In some implementations, the feature points 202 may be discrete points, without necessarily being formed by vertices of any polygons.

The body cage 200 of FIG. 2 provides an example of a low-resolution body cage with 642 feature points (or some other number of feature points) for a humanoid body geometry that excludes fingers. Other examples may use a body cage with 475 feature points (or some other number of feature points). A body cage of a humanoid geometry that includes fingers might have 1164 feature points (or some other number of feature points), for example. Higher resolution body cages may include 2716 feature points (or some other number of feature points). These numbers (and ranges thereof) of feature points are just some examples—the number of feature points may vary from one implementation to another depending on factors such as preferred resolution, processing capability of the 3D platform, user preferences, size/shape of the mannequin, etc.

Figure 3:
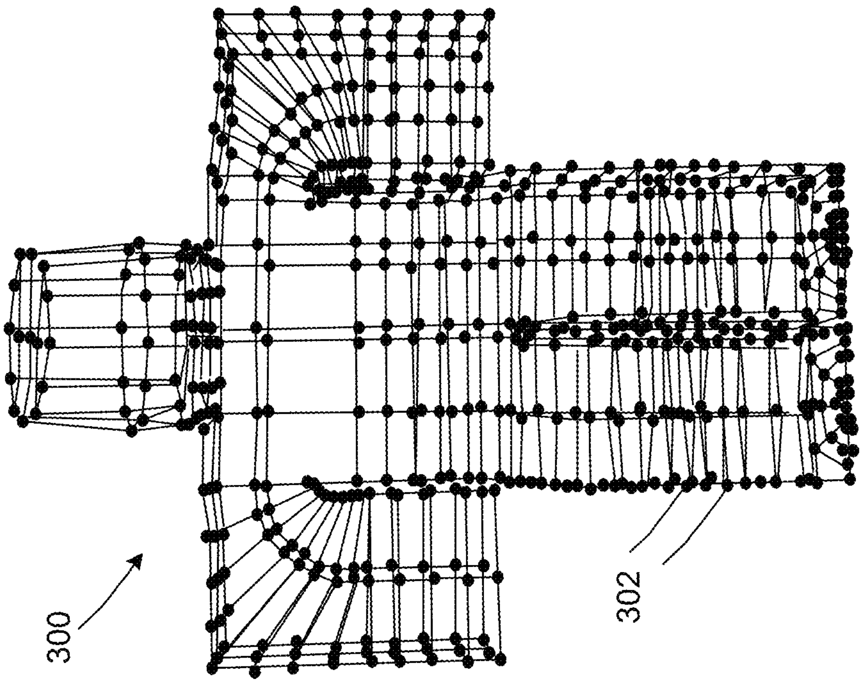
FIG. 3 illustrates another example body cage, in accordance with some implementations.

FIG. 3—Example Body Cage

FIG. 3 illustrates another example body cage 300, in accordance with some implementations.

Cages may be provided for any arbitrary avatar body shape or clothing shape. The body cage 300 in the example of FIG. 3 is an outer cage that envelopes or is superimposed on the external surface/contours of a body mesh of a generic gaming avatar body shape.

Compared to the body cage 200 of FIG. 2, the body cage 300 of FIG. 3 may have the same number of feature points. In some implementations, the body cage 300 may have a number of feature points that is different in number compared to the body cage 200, such as a fewer or greater number of feature points 302 as a consequence of a different (simpler or more complex) geometric shape of the gaming avatar and/or based on other factor(s). Thus, the number of feature points from one body cage to another may be selected as appropriate for different body shapes or other body properties.

Figure 4:
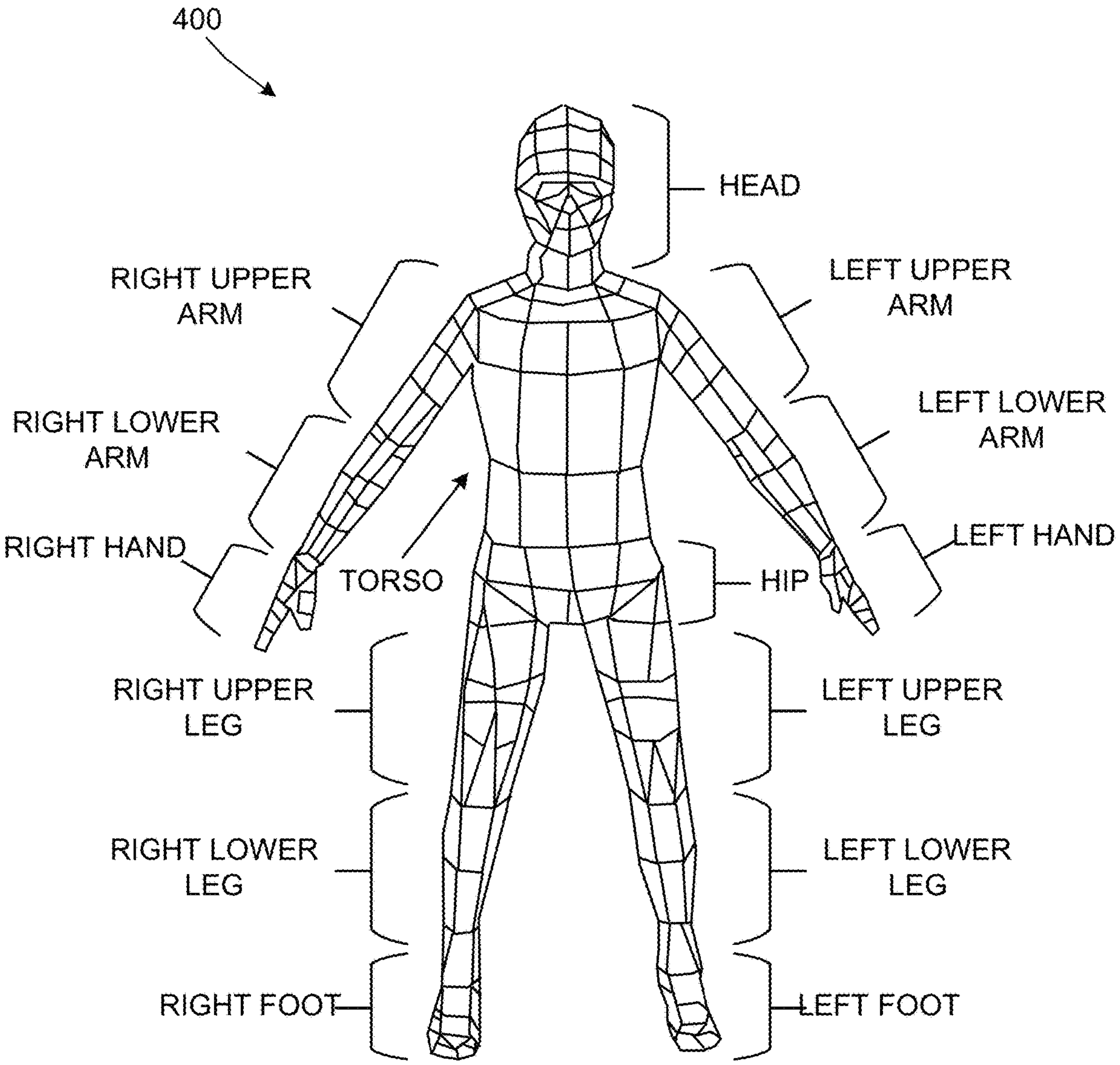
FIG. 4 illustrates an example of portions of a body cage that are grouped into corresponding body parts, in accordance with some implementations.

FIG. 4—Portions Of Body Cage

FIG. 4 illustrates an example of portions of a body cage 400 that are grouped into corresponding body parts, in accordance with some implementations.

In some implementations, for bandwidth and performance/efficiency purposes or other reason(s), the number of feature points of a cage may be reduced to a smaller number than those provided above, such as 475 feature points (or some other number of feature points). Furthermore, in some implementations, the feature points (vertices) in a body cage may be arranged into a plurality of groups (e.g., 15 groups) that each represent a portion of the body shape. FIG. 4 illustrates an example of portions of a body cage 400 that are grouped into corresponding body parts, in accordance with some implementations.

More particularly, the 15 body parts illustrated in FIG. 4 are (for a humanoid mannequin): head, torso, hip, right foot, left foot, left lower leg, right lower leg, left upper leg, right upper leg, left hand, right hand, left lower arm, right lower arm, left upper arm, and right upper arm. The number of parts in any body shape may be greater or fewer than the 15 body parts illustrated. For example, a "one-armed" avatar character might have 12 (as opposed to 15) body parts, due to the omission of a hand, lower arm, and upper arm. Furthermore, other body shapes may involve a fewer or greater numbers of body parts, depending on factors such as body geometry, preferred resolution, processing capability, type of avatar character (e.g., animal, alien, monster, and so forth), etc.

Each of the 15 groups/parts in FIG. 4 includes the feature points that define that part of the avatar body. Such group(s) of feature points may in turn be mapped to a corresponding piece of clothing. For example, the feature points in the body cage 400 that define the left/right lower arms, the left/right upper arms, and the torso may be used as an outer cage to be mapped with an inner cage of a jacket, in that a graphical representation of jacket is made up of graphical meshes that render left/right arms and a torso of the jacket that logically and correspondingly fit over left/right arms and a torso of an avatar body.

Moreover, this separation into multiple groups (such as illustrated in FIG. 4) enables customized fitting of a piece of clothing over atypical body shapes. For instance, a 3D avatar may be in the form of a "one-armed" avatar character that is missing the left arm. Thus, the body cage for that 3D avatar lacks the groups of feature points corresponding to the left hand, left lower arm, and left upper arm.

When a jacket is subsequently selected for fitting over that 3D avatar, the right lower arm, right upper arm, and torso of the jacket may be deformed to fit over the corresponding right lower arm, right upper arm, and torso of the 3D avatar (body mannequin), and the left lower arm and the left upper arm of the jacket are not deformed (e.g., remains rigid in its original form from its parent space) since there is no left arm cage in the body mannequin to deform against.

Figure 5:
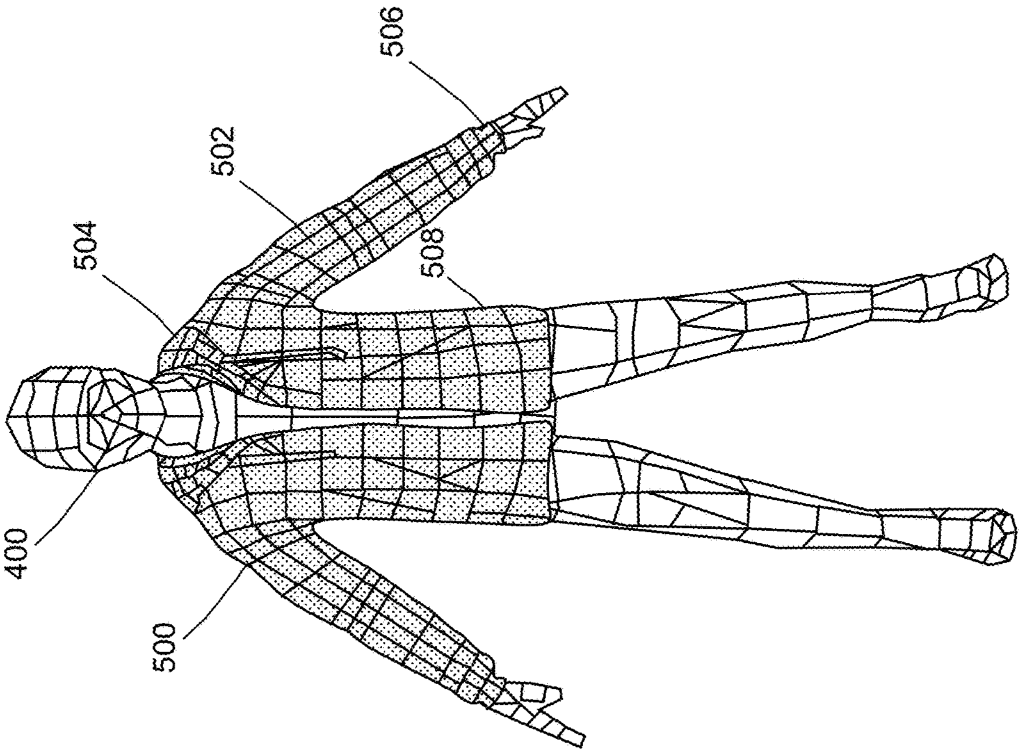
FIG. 5 illustrates an example of a clothing layer deformed over a body cage, in accordance with some implementations.

FIG. 5—Clothing Layer Deformed Over Body Cage

FIG. 5 illustrates an example of a clothing layer 500 deformed over a body cage (such as the body cage 400 illustrated in FIG. 4), in accordance with some implementations. The clothing layer 500 is a graphical representation of a jacket (illustrated in gray shading in FIG. 5) having parts that may be generated/rendered using a polygon mesh 502 (e.g., a clothing mesh) that is comprised of a collection of vertices, edges, and faces (which may be triangle faces or other polygon faces).

The clothing layer 500 includes an inner cage (not illustrated in FIG. 5) having feature points that correspond to the feature points of the body cage 400. Specifically, the feature points of the inner cage of the clothing layer 500 are mapped to the feature points of the body cage 400 that make up the left and right lower arms, the left and right upper arms, and the torso.

In some implementations, this mapping includes mapping the feature points of the inner cage of the clothing layer 500 directly onto the coordinate locations of the corresponding feature points of the arms and torso of the body cage 400. Such mapping may involve a 1:1 correspondence when both cages have same number of feature points, and the mapping may be n:1 or 1:n (wherein n is an integer greater than 1), in which case multiple feature points in one cage may be mapped to the same feature point of the other cage (or some feature points may be unmapped).

The clothing layer 500 further includes an outer cage having feature points that are spaced apart from and linked to the corresponding feature points of its inner cage of the clothing layer 500. The feature points of the outer cage of the clothing layer 500 define or are otherwise located along the external surface contours/geometry of the jacket, so as to define features such as a hood 504, cuffs 506, straight-cut torso 508, etc. of the jacket.

According to various implementations, the spatial distances (e.g., a spatial distance between a feature point of the inner cage of the clothing layer 500 and a corresponding feature point of the outer cage of the clothing layer 500) are kept constant during the course of fitting the clothing layer 500 over an outer cage of an existing layer (or avatar body). In this manner, the feature points of the inner cage of the clothing layer 500 may be mapped to the feature points of the body cage 400, so as to "fit" the inside of the jacket over the avatar's torso and arms.

Then, with the distances between the feature points of the inner cage of the clothing layer 500 and the corresponding feature points of the outer cage of the clothing layer 500 being kept constant, the outer contours of the jacket may also be deformed so as to match the shape of the avatar body, thereby resulting in at least partial preservation of the visual appearance (graphical representation) of the hood, cuffs, straight-cut torso and other surface features of the jacket while at the same time matching the shape of the avatar body as illustrated in FIG. 5. In this manner, the clothing layer 500 may be deformed in any appropriate manner so as to fit any arbitrary shape/size of an avatar body (body cage), such as tall, short, slim, muscular, humanoid, animal, alien, etc.

Figure 6:
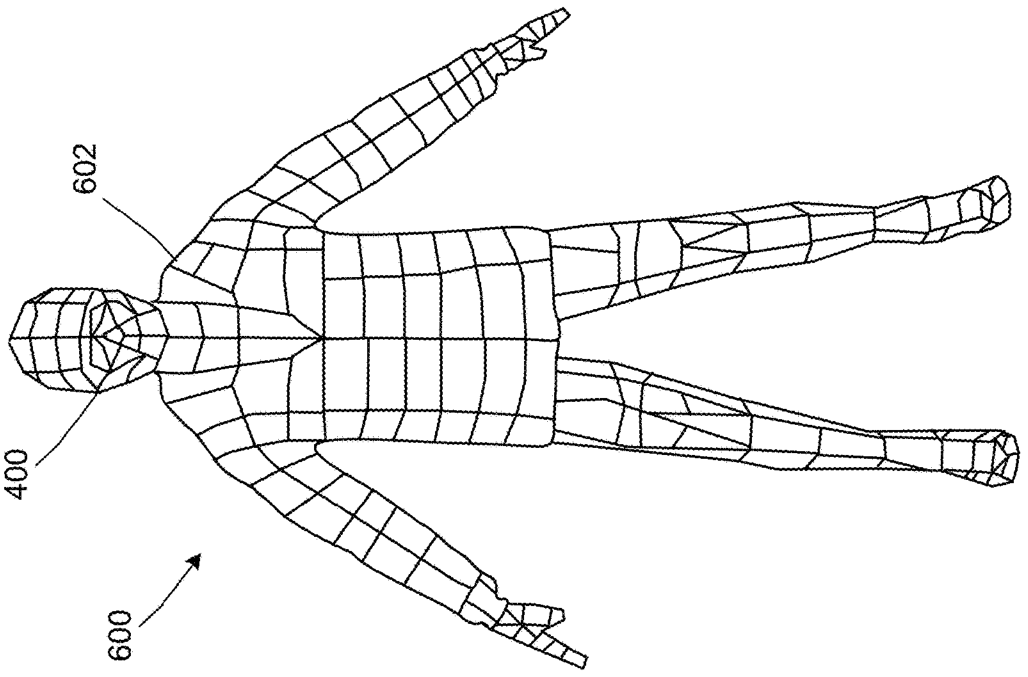
FIG. 6 illustrates an example of an outer cage formed based on the clothing layer and portions of the body cage of FIG. 5, in accordance with some implementations.

FIG. 6—Example of Outer Cage

FIG. 6 illustrates an example of an outer cage 600 formed based on the clothing layer and portions of the body cage of FIG. 5, in accordance with some implementations.

In some implementations, additional clothing layers over other clothing layer(s) may be placed (e.g., in response to user selection). FIG. 6 illustrates an example of the clothing layer and portions of the body cage 400 of FIG. 5 being used to form an outer cage 600, in accordance with some implementations. More specifically, the feature points of the outer cage of the clothing layer 500 of FIG. 5 are now combined with the feature points of the body cage 400, so as to result in a composite outer cage 600 that is made up of feature points of exposed portions of the body cage 400 and feature points along the exterior surface of the jacket.

For example, the exposed outer surfaces 602 of the jacket (formed by the body, hood, and sleeves of the jacket) provide a set of feature points and the exposed legs, hands, head, and part of the chest of the body that are not covered by the jacket provide another set of feature points, and these two sets of feature points (combined) provide the feature points of the outer cage 600.

The feature points of the outer cage 600 in FIG. 6, which correspond to and define the outer surface/shape of the jacket, may be the same feature points of the outer cage of the clothing layer 500 of FIG. 5. In some implementations, different and/or additional and/or fewer feature points may be used for the region of the jacket in the outer cage 600 in FIG. 6, as compared to the feature points for the outer cage of the jacket (clothing layer 500) of FIG. 5.

For instance, additional feature points may be computed for the outer cage 600 encompassed by the jacket area (as compared to the outer cage of the clothing layer 500 of FIG. 5), if higher resolution or more precise fitting is preferred for the next layer of clothing above the outer cage 600. Analogously, feature points may be computed for the outer cage 600 encompassed by the jacket area (as compared to the outer cage of the clothing layer 500), if a lower resolution or less precise fitting is preferred for the next layer of clothing above the outer cage 600 and/or due to other considerations such as processing/bandwidth efficiency improvements provided by using fewer feature points when possible.

In operation, if the user provides input to fit an additional clothing layer (such as an overcoat or other article of clothing) over the jacket (clothing layer 500) and/or over other parts of the avatar body, then the feature points of the inner cage of such additional clothing layer are mapped to the corresponding feature points of the outer cage 600. Deformation may thus be performed in a manner similar to that described with respect to FIG. 5. According to some implementations, radial basis function (RBF) techniques and/or other analogous interpolation techniques may be used to deform a piece of clothing that is fitted over an underlying piece of clothing or body part of an avatar.

Thus, in accordance with the examples of FIGS. 5 and 6 for layering clothing, a first layer of clothing (clothing layer 500) is wrapped around the body by matching the feature points of the "outer cage" (body cage 400) of the avatar body with the feature points of the "inner cage" of the first layer of clothing. This matching may be done in the UV space (where UV refers to a coordinate system) of the cages, so as not to have to rely on the number of feature points matching exactly between the inner and outer cages.

For example, the feature points may be vertices with both position and texture space coordinates. Texture space coordinates are usually expressed in a range [0,1] each for U,V coordinates. The texture space may be thought of as an "unwrapped" normalized coordinate space for the vertices. By performing the correspondence of the two sets of vertices in the UV space and not using their positions, vertex-to-vertex correspondence may be performed in the normalized space there by removing the hard requirement of exact vertex to vertex index mapping.

In the techniques for layering clothing, each avatar body and clothing item is thus associated with an "inner cage" and an "outer cage." In the case of the avatar body, the inner cage represents a default "mannequin" (and different mannequins may be provided for different avatar body shapes) and the "outer cage" of the avatar body represents the envelope around the shape of the avatar body. For the clothing items, the "inner cage" represents the inner envelope that is used to define how the clothing item wraps around an underlying body (or around a body with prior clothing layers already fitted on it), and the "outer cage" represents the way that the next layer of clothing is wrapped around this particular clothing item when worn on the avatar body.

Figure 7:
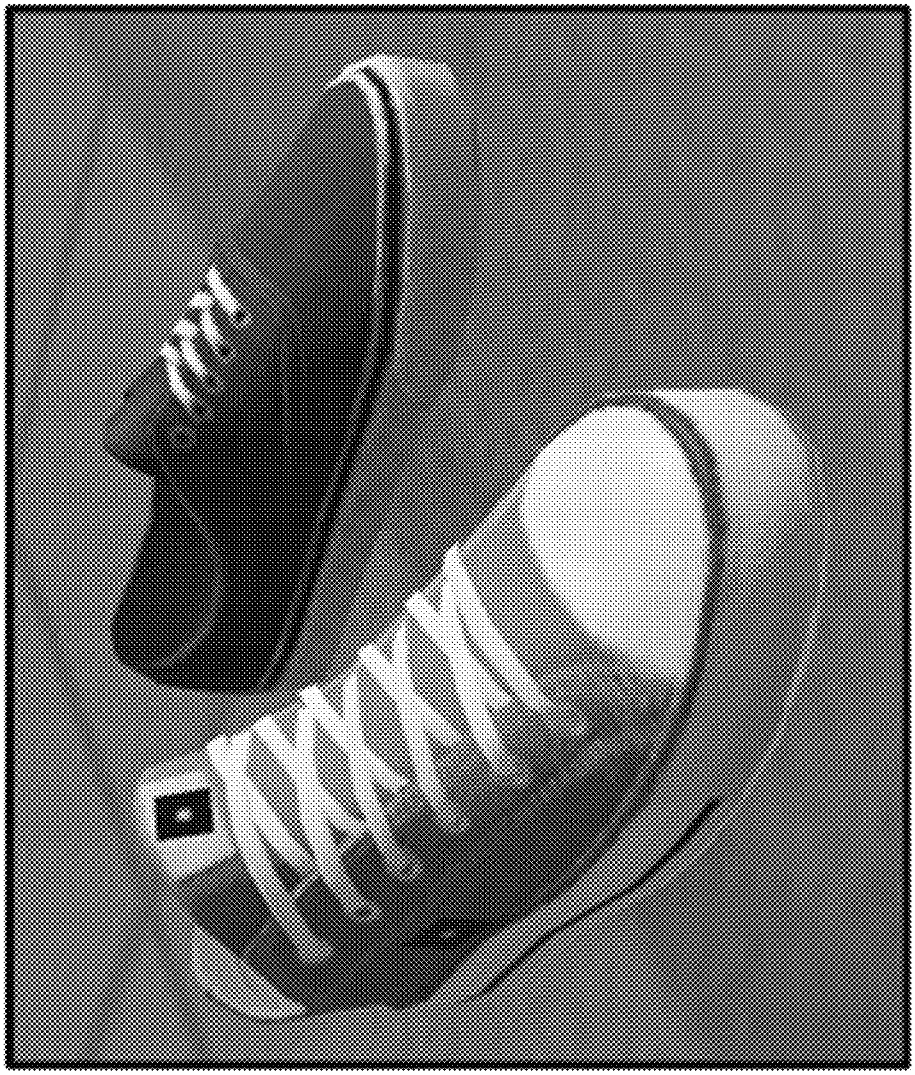
FIG. 7 illustrates example clothing items, in accordance with some implementations.

FIG. 7—Example Clothing Items

FIG. 7 illustrates example clothing items, in accordance with some implementations. More specifically and purely for the purpose of illustrating the implementations that are be described hereinafter, FIG. 7 illustrates shoes 700 and 702. The techniques described herein may be applied to other types of clothing items such as pants, hats, gloves, shirts, headbands, shoulder pads, scarves, wristbands, anklets, rings worn on fingers/toes, earrings, nose rings, other accessories worn on a face, etc.

Each shoe 700 and 702 may have a different style, brand, shape, color, size, design, or other appearance-related characteristic For example, the shape, color, design, etc. of a particular shoe 700 or shoe 702 may correspond to the branding and product line of various shoe manufacturers. As other examples, the shoe 700 or shoe 702 may be a customized shoe generated by a graphical artist or other clothing creator who creates graphical objects that are placed in a library for consumption by virtual experience users, and such shoe may not necessarily have branding associated with the shoe that is specifically tied to an actual/physical shoe provided by a shoe manufacturer/vendor.

Figure 8:
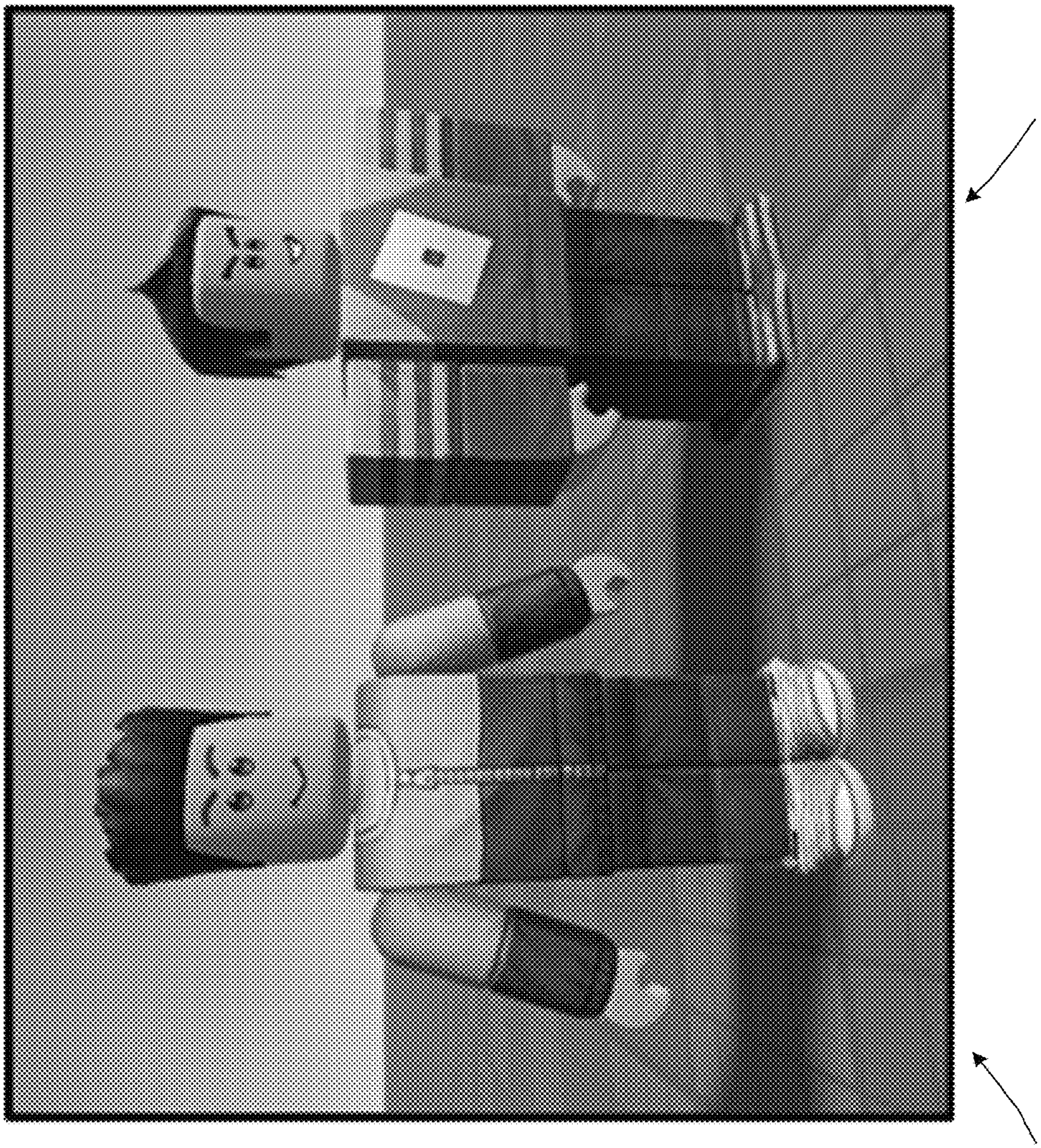
FIG. 8 illustrates the clothing items of FIG. 7 fitted onto avatars, using a prior technique.

FIG. 8—Clothing Items Fitted Onto Avatars

FIG. 8 illustrates the clothing items of FIG. 7 fitted onto avatars, using a prior technique. More specifically in the examples of FIG. 8, the shoes 700 and 702 of FIG. 7 have been respectively fitted onto the feet of two avatars 800 and 802.

As illustrated in the examples of FIG. 8, the prior technique has resulted in a non-ideal fit/appearance for the shoe 700 and the shoe 702 that have been deformed to respectively overlie the feet of the two avatars 800 and 802. For the avatar 800, its shoes appear crumpled or otherwise distorted/misshapen, and do not closely match the appearance (e.g., shape, size, etc.) of the corresponding shoe 700 in FIG. 7. Analogously for the avatar 802, its shoes appear flattened, out-of-proportion, or otherwise distorted/misshapen, and do not closely match the appearance (e.g., shape, size, etc.) of the corresponding shoe 702 in FIG. 7.

One reason for the misshapen/distorted appearance in FIG. 8 is that a radial basis function (RBF) or another prior deformation technique (a layered clothing technique) uses a vector field to deform (e.g., wrap) clothing items to fit onto arbitrary avatars. This field may be constructed using an "outer cage" defined by the avatar and an "inner cage" defined by the clothing item, as previously described above. This deformation technique for providing layered clothing generally works well for most clothing but causes issues for any items that have more complex tailoring constraints. FIG. 8 illustrates examples of such issues.

With respect to the shoe examples of FIG. 8, at least two issues are present. A first issue is that the wrap may create shoes with unappealing proportions and unnatural distortions. This issue may be problematic for real-world shoe manufacturers/vendors who intend to have the fitted shoe 700 and/or the fitted shoe 702 on an avatar in a 3D virtual experience match or otherwise sufficiently maintain the branding/appearance of their product line(s).

For example, the appearance of the shoe 700 and the shoe 702 may be iconic to the shoe manufacturer/vendor, and any unintentional distortion may adversely affect the branding (e.g., product recognition, marketing, etc.). As another example, a graphics artist (who places template shoes in a library for consumption by users, and who spends a great amount of effort in the design and creation of the shoes) may have a negative reaction, when the graphics artist sees his/her work badly distorted when fitted by a user onto an avatar.

A second issue is that the final shape and proportions of the shoe are controlled primarily by the avatar's outer cage, such as previously explained above. A consequence of this is that the creator of the shoe (e.g., the above graphics artist) may have no control over the shape of the wrapped shoe. That is, the graphics artist has no control over the outer cage, which may vary from one situation to another, dependent on the particular shape/size of the avatar being used by the user, the underlying clothing item(s) being fitted onto the avatar, etc.

The graphics artist may create the inner cage for a clothing item but has no control over how such inner cage may be mapped to an outer cage (of an underlying avatar body part or clothing item) during the wrapping/deformation process so as to fit the clothing item onto the underlying avatar body part or item of clothing.

Figure 9:
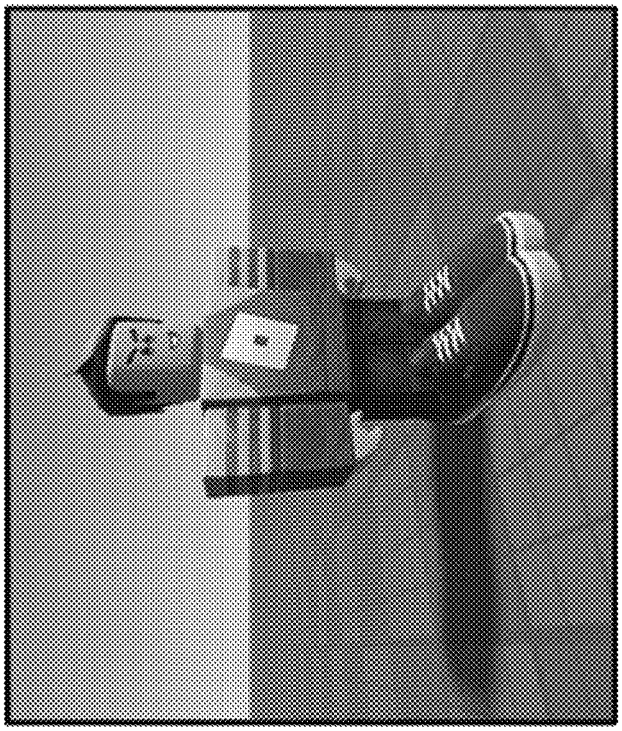
FIG. 9 illustrates an example of clothing items fitted onto avatars using a rigid approach.
Figure 10:
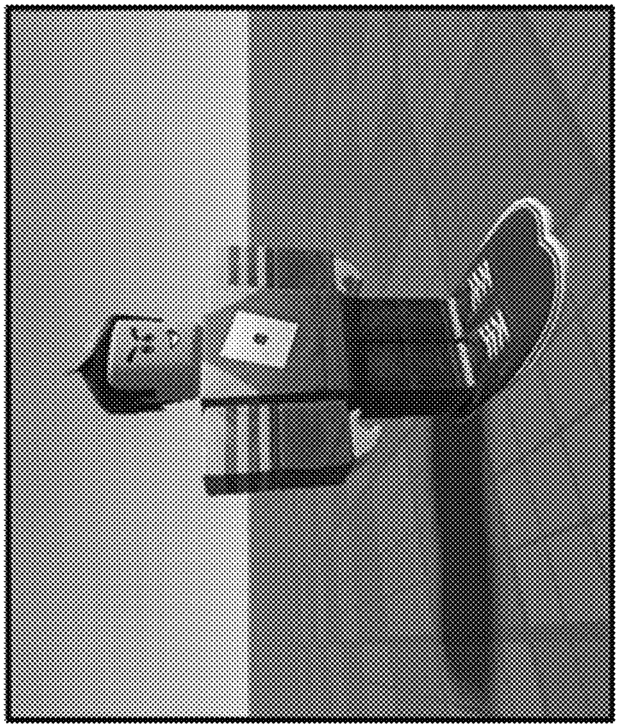
FIG. 10 illustrates another example of clothing items fitted onto avatars using a rigid approach.

FIGS. 9-10—Clothing Items Fitted Onto Avatars Using Rigid Approach

FIG. 9 illustrates an example of clothing items fitted onto avatars using a rigid approach. FIG. 10 illustrates another example of clothing items fitted onto avatars using a rigid approach.

One possible technique to address the above issues is a rigid approach to fitting a clothing item onto an avatar. FIGS. 9 and 10 illustrate items of clothing (e.g., shoes) fitted onto avatars using a rigid approach, as examples. In a rigid approach, one or more characteristics of the item of clothing may be kept original, while other characteristics may be modified during the deformation process. For example, the original shape of the shoe may be preserved, but other characteristics (such as scaling) may be modified.

However, while a naïve "as rigid as possible" approach may preserve the original shape or other visual characteristics, the resulting proportions or other visual appearance may be unappealing. In the example of FIG. 9, an avatar 900 has the shoes 702 of FIG. 7 fitted thereon in a manner that preserves the shape of the original shoes 702 but resizes the shoes 702 (e.g., changes the length, width, and height via isotropic scaling) of the shoes 702 so as to fit the ankle of the avatar 900, and without any other deformation.

Nonetheless, the result is visually unappealing, because the shoes 702 have a height that goes up to the knees of the avatar 900 and the shoes 702 appear like clown shoes that are too large as compared to the size and shape of the avatar 900 and its feet, even though the shoes 702 do properly fit the ankles of the avatar 900.

In the example of FIG. 10, an avatar 1000 has the shoes 702 of FIG. 6 fitted thereon in a manner that preserves the length and width of the shoes 702 (and also performs resizing/rescaling to properly fit the shoes to the ankles), but performs deformations on the shape and height of the shoes 702 to better conform to the size/shape of the feet of the avatar 1000. Nonetheless, the result is also visually unappealing, because the shoes still appear too large (e.g., long) as compared to the size and shape of the avatar 1000 and its feet. For instance, while the height of the shoe 702 may have been deformed so as to more accurately conform to the height of the feet of the avatar 1000 around the ankles (and thus no longer extend to the knees of the avatar 1000), the length and width of the shoe 702 were kept rigid/constant, thereby resulting in the avatar 1000 having an unintentional appearance of long, wide, and flat duck feet.

Figure 11A:
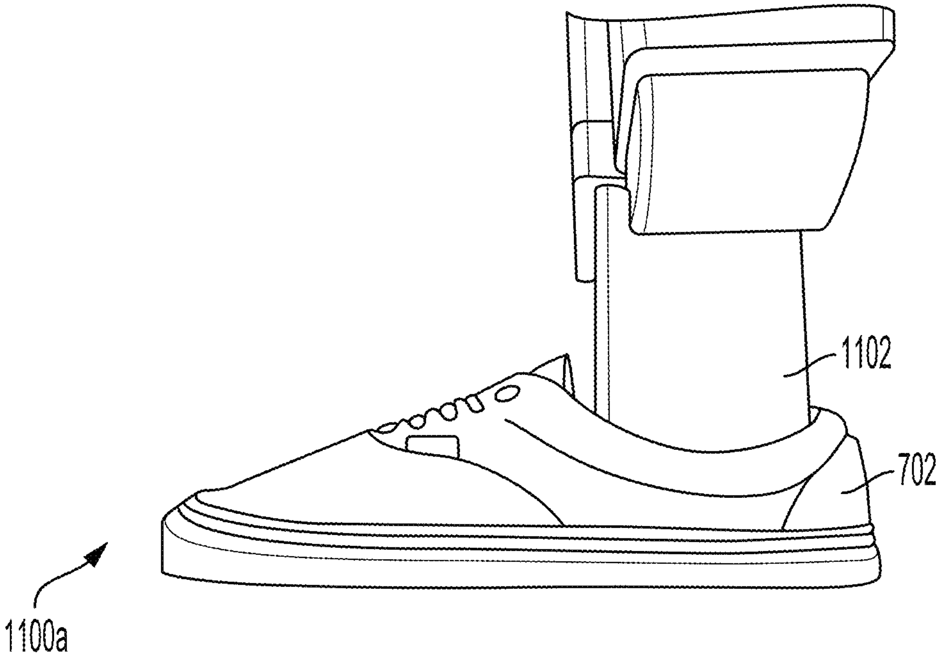
FIGS. 11A-11B illustrate examples of measurements/features for use in fitting a clothing item onto an avatar, in accordance with some implementations.
Figure 11B:
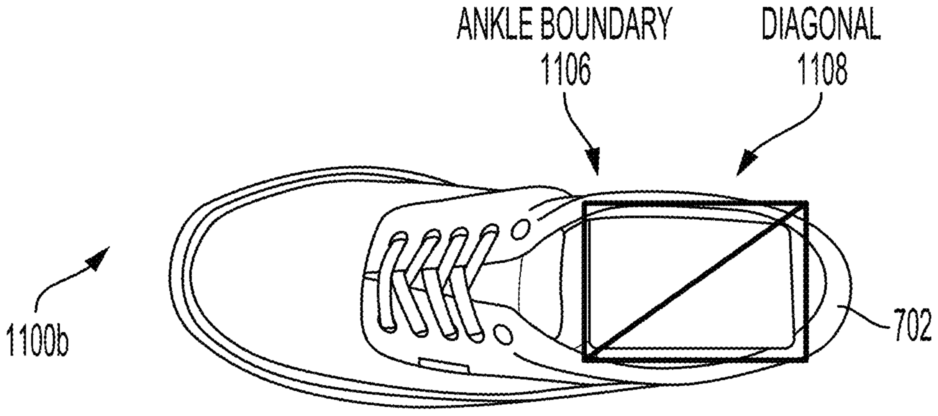
Figure 12:
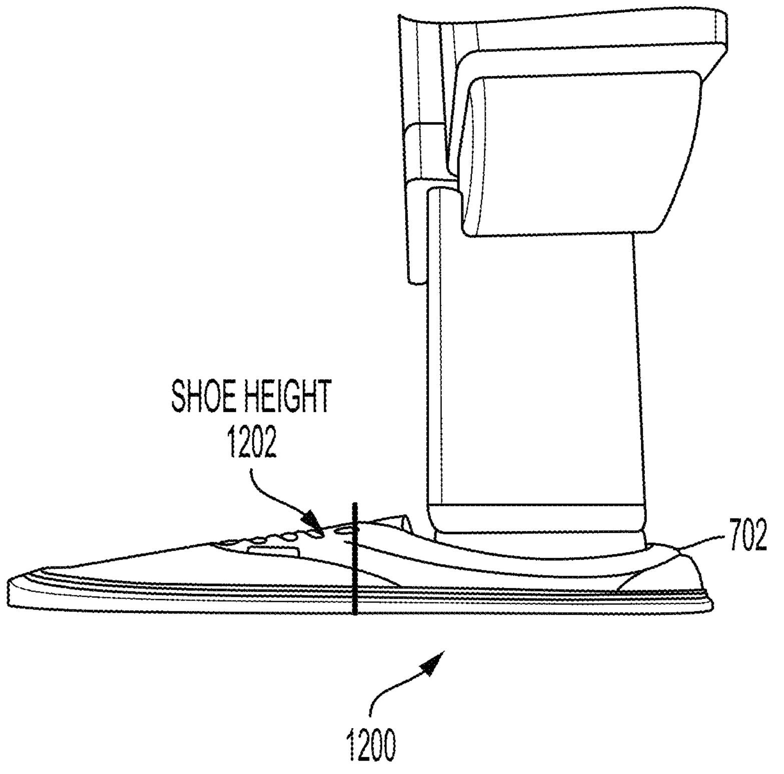
FIG. 12 illustrates additional examples of measurements/features for use in fitting a clothing item onto an avatar, in accordance with some implementations.
Figure 13A:
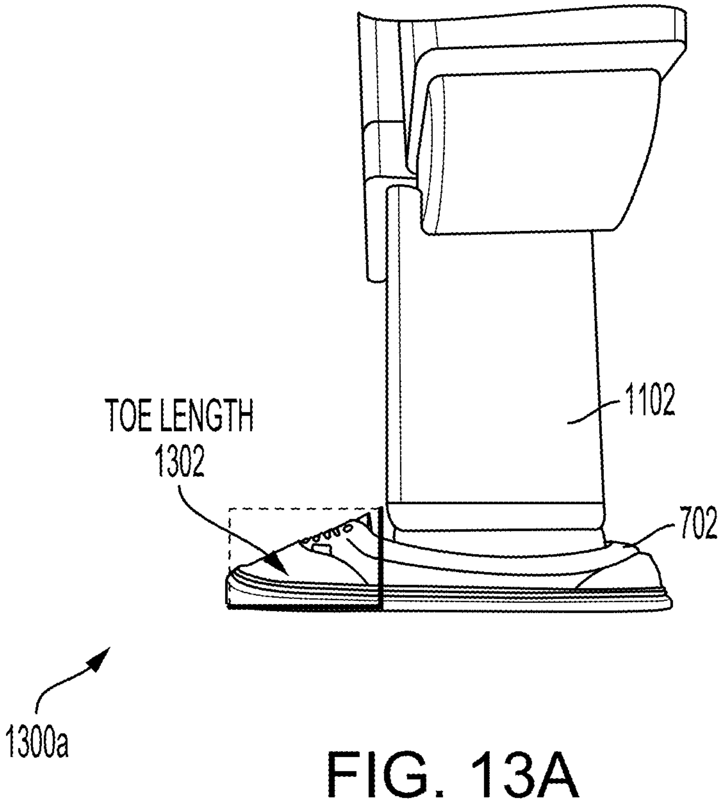
FIGS. 13A-13B illustrate additional examples of measurements/features for use in fitting a clothing item onto an avatar, in accordance with some implementations.
Figure 13B:
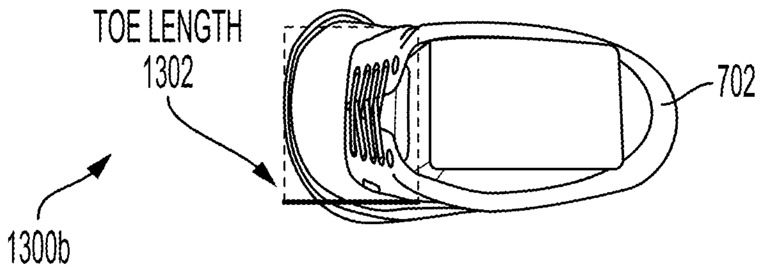
Figure 14:
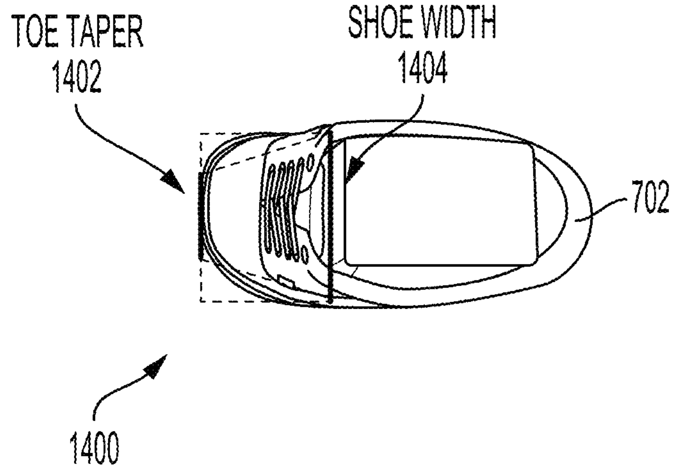
FIG. 14 illustrates additional examples of measurements/features for use in fitting a clothing item onto an avatar, in accordance with some implementations.

FIGS. 11A-14—Measurements/Features for Use in Fitting a Clothing Item onto an Avatar FIGS. 11A-11B illustrate examples of measurements/features for use in fitting a clothing item onto an avatar, in accordance with some implementations. FIG. 12 illustrates additional examples of measurements/features for use in fitting a clothing item onto an avatar, in accordance with some implementations. FIGS. 13A-13B illustrate additional examples of measurements/features for use in fitting a clothing item onto an avatar, in accordance with some implementations. FIG. 14 illustrates additional examples of measurements/features for use in fitting a clothing item onto an avatar, in accordance with some implementations.

To address the above and/or other issues, the implementations of the fitting technique described herein divide the shoe into multiple regions: the toe (e.g., the toe and bridge) region, and the heel (e.g., the arch, heel, and mouth) region. The mouth of the shoe is constrained to fit the ankle of the avatar, which correspondingly constrains the length and width of the heel region, but the shoe may scale more freely in height, and the toe of the shoe may scale more freely in length and taper as well. These various scales may be computed to preserve certain aspect ratios from the original shoe as closely as possible. FIGS. 11A-14 illustrate examples of fitting-related measurements/features for use in operations to fit a clothing item onto an avatar in more detail, in accordance with some implementations.

Referring first to FIG. 11A, a side view 1100*a* illustrates the shoe 702 of FIG. 6 being isotropically scaled such that the mouth of the shoe 702 is resized to fit/conform to an ankle 1102 of an avatar. With this scaling, the shape of the shoe 702 is preserved (e.g., there is not yet any other deformation performed)—what is changed is the sizing/scaling of the shoe 702 for purposes of fitting the mouth of the shoe 702 to the ankle 1102. As may be seen in the example of FIG. 11A, the scaling of the shoe 702 results in the top of the shoe 702 reaching to about the knees of the avatar, even though the shoe 702 fits the avatar at the ankle 1102.

A top view 1100*b* in FIG. 11B illustrates the mouth of the shoe 702 being sized to fit ankle boundary 1106 of the ankle of the avatar. In this example, the ankle boundary 1106 may have a generally rectangular shape and may include a diagonal 1108 between diagonally opposing corners of the ankle boundary 1106.

FIGS. 11A-11B thus illustrate the initial measurement(s) for the operation(s) in the fitting method wherein the shoe 702 is scaled to fit the shoe's mouth to the avatar's ankle, and also isotropically scaling the other characteristics (such as the height) of the shoe 702. The example of FIGS. 11A-11B use the ankle boundary 1106 as a landmark or reference feature of an avatar for purposes of performing the scaling of the shoe 702. For other types of clothing, other landmarks or references features of an avatar may be used, such as the head boundary for a hat, the wrist boundary for a glove, the neck and torso boundaries for a shirt, and so forth.

Next in FIG. 12, a side view 1200 illustrates that the height 1202 of the shoe 702 has been scaled to match the avatar's foot, while being constrained relative to the original height of the shoe 702, the original mouth diagonal of the shoe 702, and the new mouth diagonal 1108. This prevents the height 1202 of the shoe 702 from being crushed more than a default or user-defined amount.

More particularly, the operation previously illustrated in FIGS. 11A-11B has resized the shoe 702 to fit the ankle 1102, but the height of the shoe 702 improperly is at the same level as the knee of the avatar—accordingly, the fitting technique next performs an operation to determine an amount of height scaling/adjustment that is preferred for the shoe 702 such that the mouth of the shoe 702 is lower than knee-level—FIG. 12 illustrates the result of this height scaling.

For additional context, some avatars have extremely flat feet (e.g., appearing paper thin or "pancake feet"). Performing a scaling and/or deformation of a shoe, so as to conform the height of the shoe solely to the height/thickness of the avatar's feet (so to match the ankle height), while being fitted to the ankle size at the mouth of the shoe, may result in a highly distorted/misshapen flat shoe.

Therefore, in the implementation illustrated in FIG. 12, the dimension of diagonal 1108 is used as a constraint to control an amount of scaling of the height 1 202 of the shoe 702. The diagonal 1108 may be used as a reference/constraint in this manner, for example, because the diagonal 1108 provides a reasonable representation of size of the ankle 1102 for use in scaling the height 1202 of the shoe 702, as opposed to using the individual x-dimensions or y-dimensions of the ankle boundary 1106 to control the scaling of the height 1202.

As an illustration, the original height of the shoe 702 may be 1 cm (as a non-limiting example) and the original mouth diagonal of the shoe may be 3 cm (as a non-limiting example), prior to the scaling performed in FIGS. 11A-11B to fit the ankle 1102. A ratio of the original height to the original mouth diagonal is therefore 1:3. Then, after the scaling is performed in FIGS. 11A-11B to fit the mouth of the shoe 702 to the ankle 1102, the new mouth diagonal 1108 may have been resized to 2 cm (as a non-limiting example). In order to preserve the ratio of 1:3, the height 1202 of the shoe 702 in FIG. 12 may be resized to 0.67 cm (as a non-limiting example). In this manner, the overall visual character of the shoe 702 with respect to height may be preserved.

In some implementations, the user may additionally adjust the height of the shoe 702 (e.g., upwards or downwards) in a manner that deviates from the base ratio of 1:3. For instance, some avatars may have relatively wider or narrower ankles, relatively flatter or thicker feet, etc. The additional adjustment by the user may be used to more closely conform the height of the shoe to the foot, while still being constrained to some extent by the ratio. In such implementations, minimum and maximum limits may be configured so as to avoid extreme changes in height that may begin to unintentionally distort the visual appearance of the shoe 702.

Next in FIGS. 13A-13B, measurements are taken for an operation to scale the toe length of the shoe 702 to match the avatar's toe length, while being constrained relative to the original toe length of the shoe 702, the original height of the shoe 702, and the new height of the shoe (illustrated at 1202 in FIG. 12). This scaling and constraining in FIGS. 13A-13B are performed so as to prevent the shoe 702 from being unintentionally deformed (e.g., crushed along the horizontal) more than a default or user-defined amount.

In more detail, the shoe 702 in previous FIGS. 11A, 11B, and 12 is illustrated as having an unnatural toe length, relative to the size of the avatar. In the scaling performed in a side view 1300*a* of FIG. 13A, the toe length 1302 has been resized (e.g., shortened) in a manner related to the shoe height 1202 (determined in FIGS. 11A-11B and illustrated also in FIG. 13), and also relative to original proportions.

For instance, if the proportion of the toe length versus shoe height of the original template shoe 702 (prior to any scaling or deformation) is 2 cm (as a non-limiting example) to 1 cm (as a non-limiting example) (a ratio of 2:1), then the toe length 1302 in FIG. 13A is 1.33 cm, so as to preserve the 2:1 ratio with the shoe height 1202 (which is at 0.67 cm, as a non-limiting example). If the shoe height 1202 has undergone some further adjustment by the user (such as previously described above with respect to FIG. 12), then the toe length 1302 may also be correspondingly adjusted to maintain the same ratio or to a deviate from the ratio, within maximum or minimum limits. Hence, the ratio may be kept within a certain predetermined range.

According to various implementations, one or more of the ratios described herein may comprise a ratio within a range of ratios. For instance, there may be a minimum ratio and maximum ratio, and scaling is permitted so that the resulting ratio falls within the maximum and minimum. In other implementations, the minimum and maximum ratios may be permitted deviations or tolerances from a base ratio. Furthermore, a user may further adjust the scaling within the permitted range of ratios (or even outside of the permitted ratios), depending on the resulting visual effect preferred by the user.

In some implementations, the relationship between dimensions/sizing may be based on some other methodology that may not necessarily involve the ratios such as described herein by example. For instance, if the diagonal 1108 has been resized from 3 cm to 2 cm (e.g., a reduction of 33%), then such a change may be used as a constraint specifying that the height of the shoe may be reduced to a maximum of 33%, plus some amount of permitted deviation. As another example, a more elaborate mathematical formula may be used to relate the height to the diagonal, the height to the toe length, etc., with or without further adjustment factors or permitted deviations.

A top view 1300*b* in FIG. 13B further illustrates the toe length 1302 of the shoe 702. As illustrated in the top view 1300*b*, the shoe 702 is sized in length so as to prevent the toe of the shoe 702 from completely disappearing (such as illustrated for the avatar 802 in FIG. 8), or more particularly, the fitting method advantageously limits the permissible amount of shortening of the toe length so as to guarantee a satisfactory visual appearance of the shoe 702.

Nevertheless, the shoe 702 may have a blunt "squashed toe" appearance after the toe length scaling is performed, such as illustrated in the top view 1300*b*. One reason for this appearance is that in the top view 1100*b* of FIG. 11B, it may be seen that the shoe 702 has a slightly flared shape between the shoelaces and the tip of the shoe 702. When the toe length is resized in FIGS. 13A-13B to a shorter length, the flared shape contributes significantly to the squashed appearance of the shoe 702. To improve the visual appearance of the shoe 702 (e.g., to remedy the appearance of the squashed toe), a width taper operation may be performed next.

Referring to FIG. 14, a top view 1400 illustrates a result of the width taper operation applied to the toe of the shoe 702. A toe taper ("pinching" of the tip of the shoe 702) is computed relative to the original toe length of the shoe 702 and the original width of the shoe (e.g., another ratio), and the resulting toe taper 1402 is thus based on the new toe length and shoe width 1404 so as to preserve the ratio. The magnitude of this taper may also be user-defined or adjusted as is advantageous and/or appropriate.

In example layered clothing techniques previously described above, an outer cage is generated over the avatar's foot. With respect to FIG. 8, the presence (or absence) of this outer cage for the avatar's foot may potentially cause issues (e.g., unintentional distortions) when trying to fit a shoe (having an inner cage) over the outer cage of the foot.

Accordingly, in the implementations of the fitting method disclosed herein, measurements of the avatar (e.g., angle diagonal, toe/foot length, foot height, etc.) and of the corresponding regions (e.g., toe region, heel region, diagonal of the mouth, etc.) of the template shoe are first computed or otherwise obtained, such as illustrated in FIGS. 11A-14 previously described above. Then, these measurements are used to create a piecewise vector field that is used to deform the original shoe to fit the avatar. This vector field may be used in two ways in some implementations.

First, the inner cage of the template shoe may be deformed using the measurements in this vector field, and then the deformed inner cage replaces/deletes any outer cage that the avatar's foot may or may not have. This inner cage deformation operation is sufficient to deform the shoe to approximately the correct fit for the foot.

The reshaped cage of the shoe may also be used to deform other layers above and below the shoe so that such layers fit the new shoe shape. This technique may be performed, for example, if there is a preference for open toes, to reshape the foot, to add any layers that might go over the shoe (such as extra-long pants), and so forth.

Figure 15:
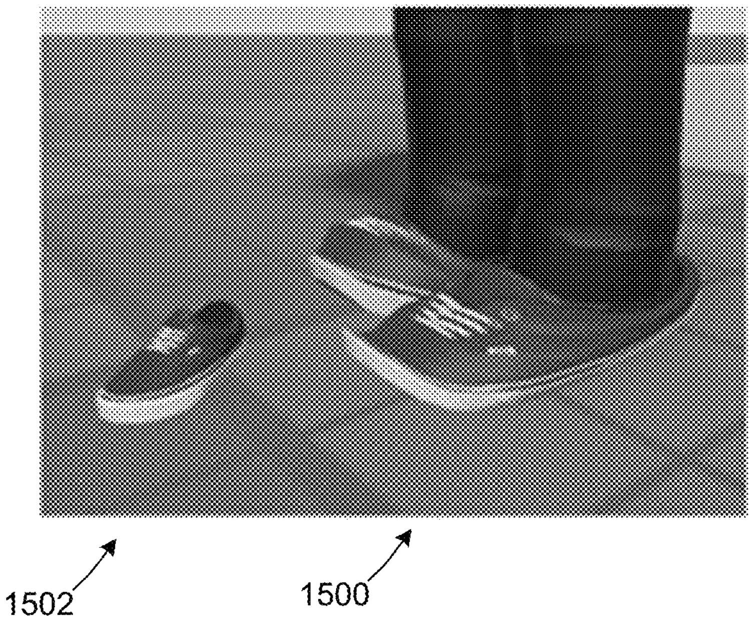
FIG. 15 illustrates an example of a distortion of a clothing item, and correction of the distortion, in accordance with some implementations.

FIG. 15—Distortion of Clothing Item

FIG. 15 illustrates an example of a distortion of a clothing item, and correction of the distortion, in accordance with some implementations.

To correct any RBF interpolation/extrapolation errors, the vector field may be used again in some implementations to deform (reshape) the original shoe geometry more precisely, which then replaces the wrap-deformed shoe geometry that may have errors. For instance, FIG. 15 illustrates shoes 1500 that result from deformation performed by using an RBF technique (or other interpolation technique). The shoes 1500 may have distortion due to the RBF technique, such as pointed toes (e.g., "elf shoes"). The shoe 1502 represents/illustrates the result after correction of the distortion.

Accordingly, appropriate corrections using the measurements in the vector field may be applied everywhere on the shoe to reshape the shoe (such as explained with reference to FIGS. 11A-14 above), except for the mouth of the shoe which is to precisely fit the avatar ankle. Blending operations may also be performed so that there is a smooth transition at certain regions of the shoe, such as between a rectangular ankle of the avatar and a rounded mouth of the shoe.

The vector field of some implementations may be a piecewise vector field. For example, the pieces of the vector field may include a scaling factor for the toes, a scaling factor for the ankle which may be different from the scaling factor for the toes, a transition between these scaling factors, the corresponding different deformation fields for these scaling factors, regions, etc.

FIGS. 16-19—Example Results Using Fitting Technique

Figure 16:
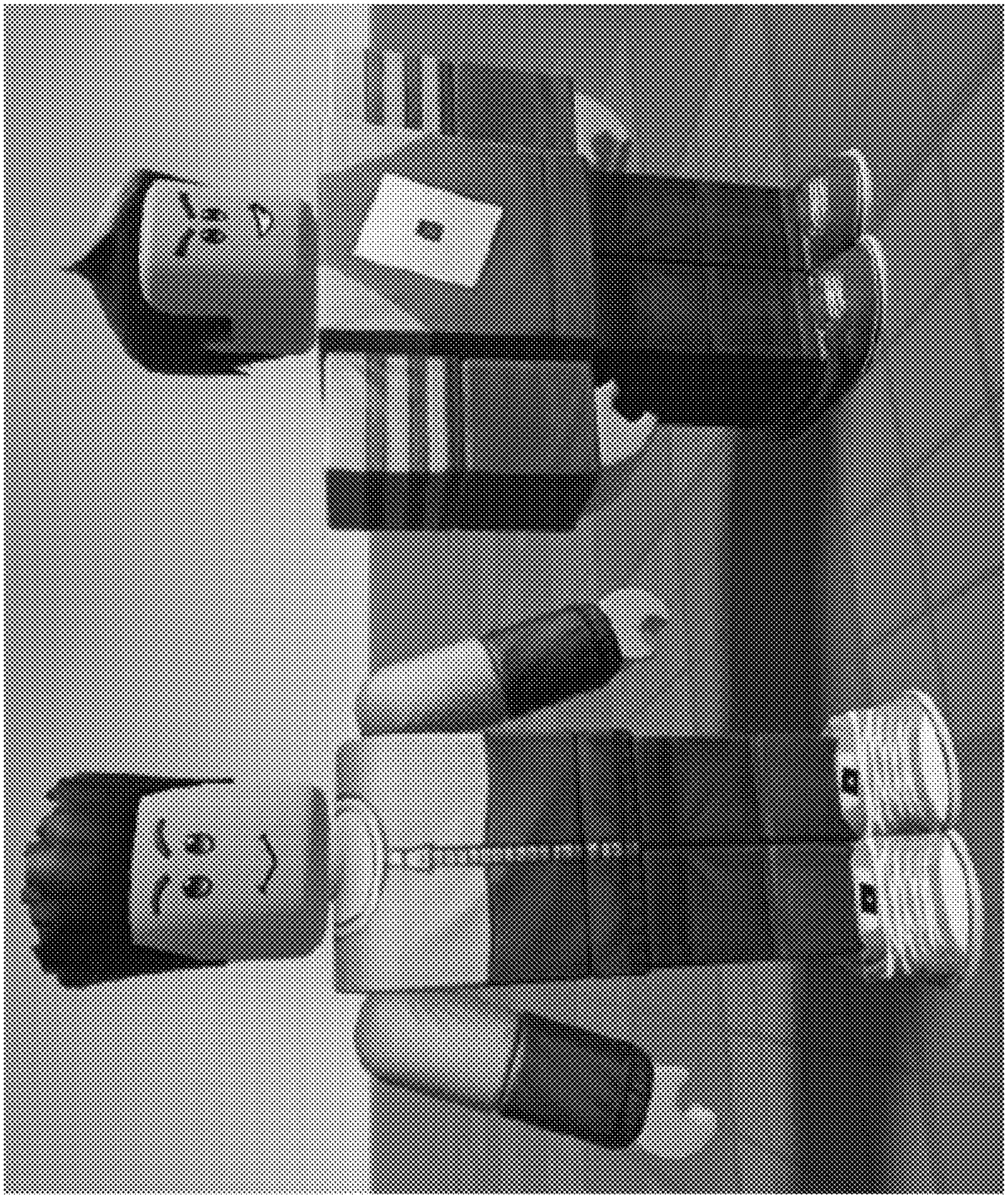
FIG. 16 illustrates example results using a fitting technique, in accordance with some implementations.
Figure 17:
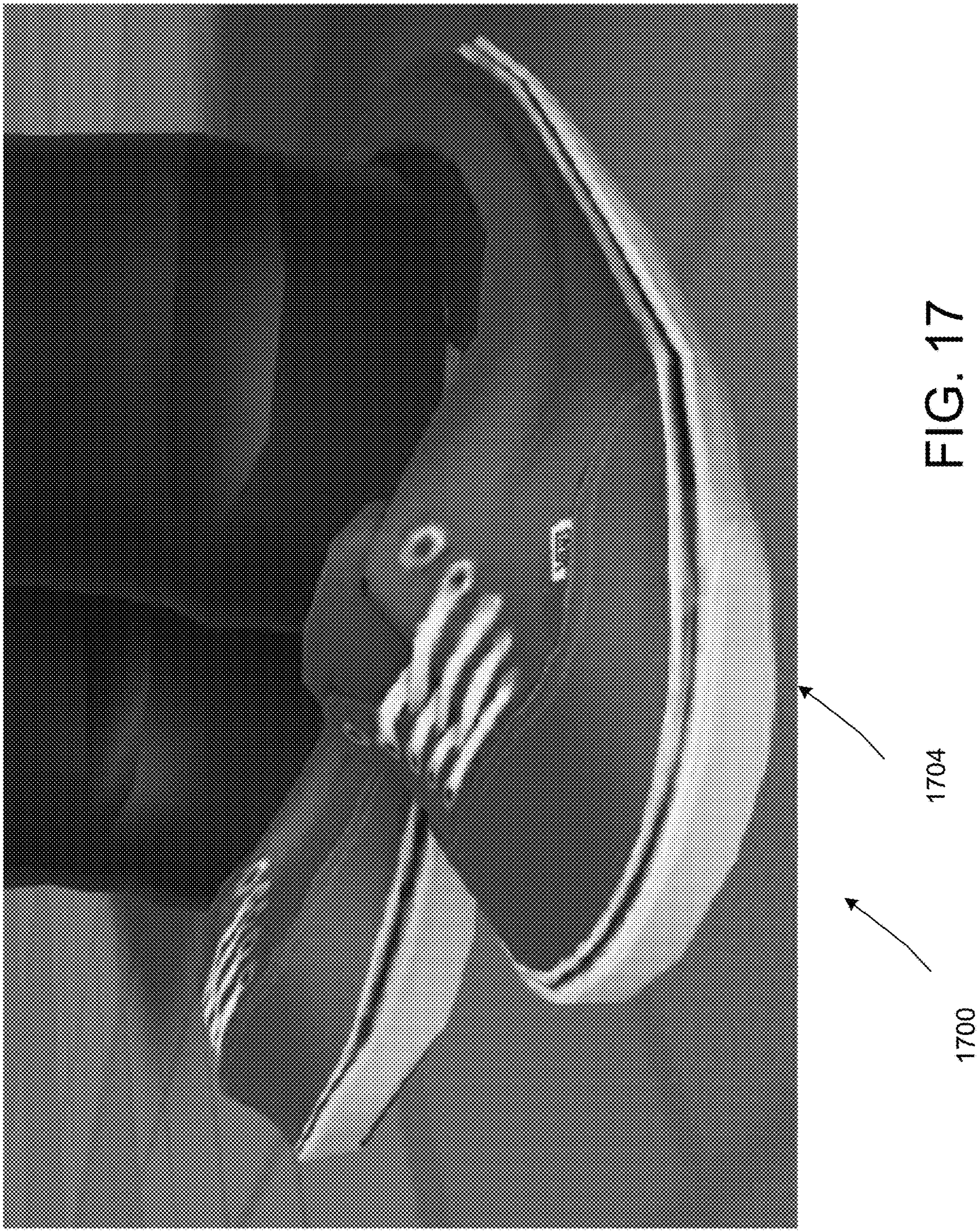
FIG. 17 illustrates additional example results using a fitting technique, in accordance with some implementations.
Figure 18:
FIG. 18 illustrates additional example results using a fitting technique, in accordance with some implementations.
Figure 19:
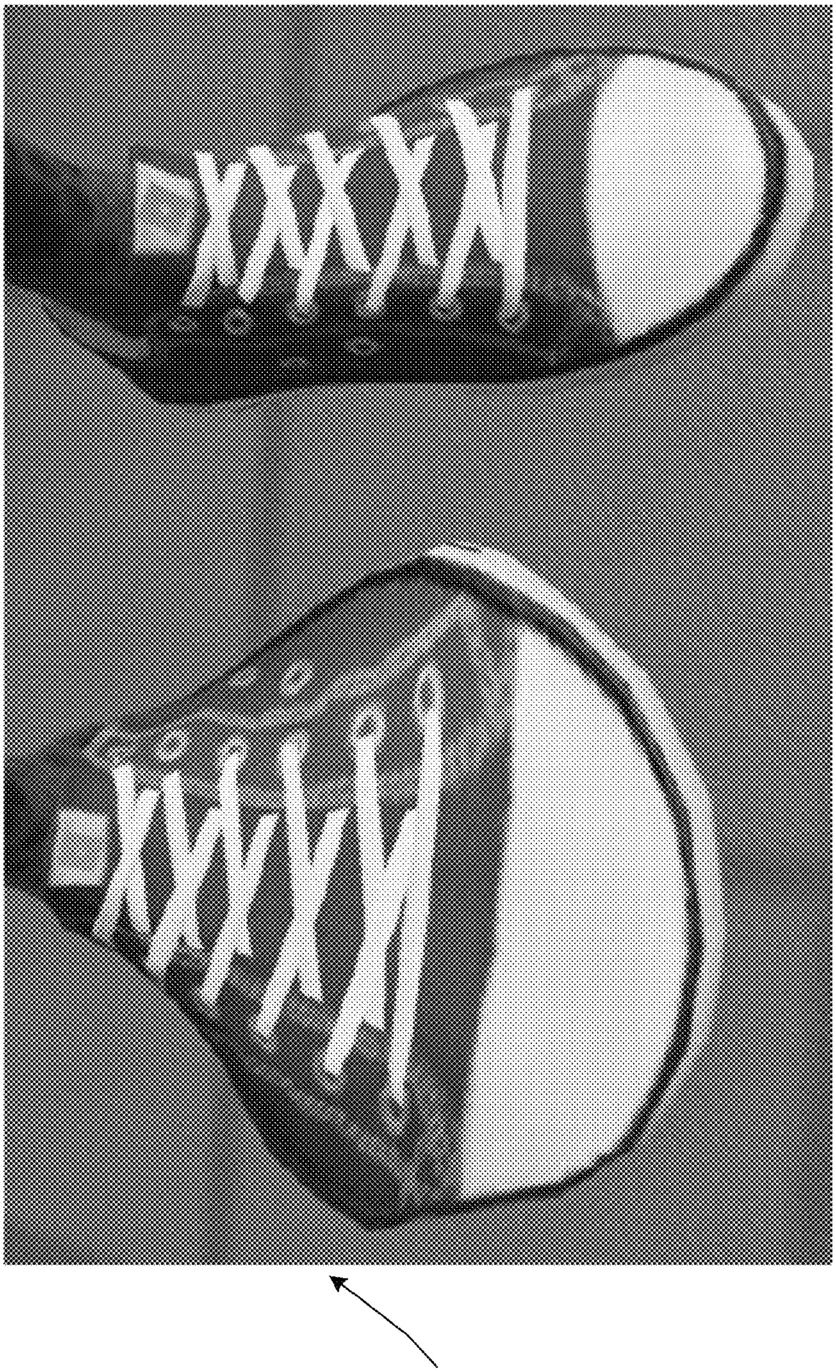
FIG. 19 illustrates additional example results using a fitting technique, in accordance with some implementations.

FIG. 16 illustrates example results using a fitting technique, in accordance with some implementations. FIG. 17 illustrates additional example results using a fitting technique, in accordance with some implementations. FIG. 18 illustrates additional example results using a fitting technique, in accordance with some implementations. FIG. 19 illustrates additional example results using a fitting technique, in accordance with some implementations.

FIGS. 16-19 illustrate example results using the fitting technique described herein. FIG. 16 illustrates avatars 1600 having shoes that have their visual character preserved, as compared to the corresponding avatars 800 and 802 in FIG. 8.

FIG. 17 illustrates shoes 1700, specifically a distorted shoe on the left 1702, and a properly fitted and non-distorted shoe on the right 1704 (for the same avatar). FIG. 18 illustrates shoes 1800, specifically a distorted shoe on the left 1802 for an avatar such as a horse or other hoofed animal without feet, and a shoe on the right 1804 (for the same avatar) that has its visual character maintained. FIG. 19 illustrates shoes 1900, specifically a distorted shoe on the left 1902 for an avatar such as a duck or paddle-foot-shaped animal, and a shoe on the right 1904 (for the same avatar) that has its visual character maintained.

Figure 20:
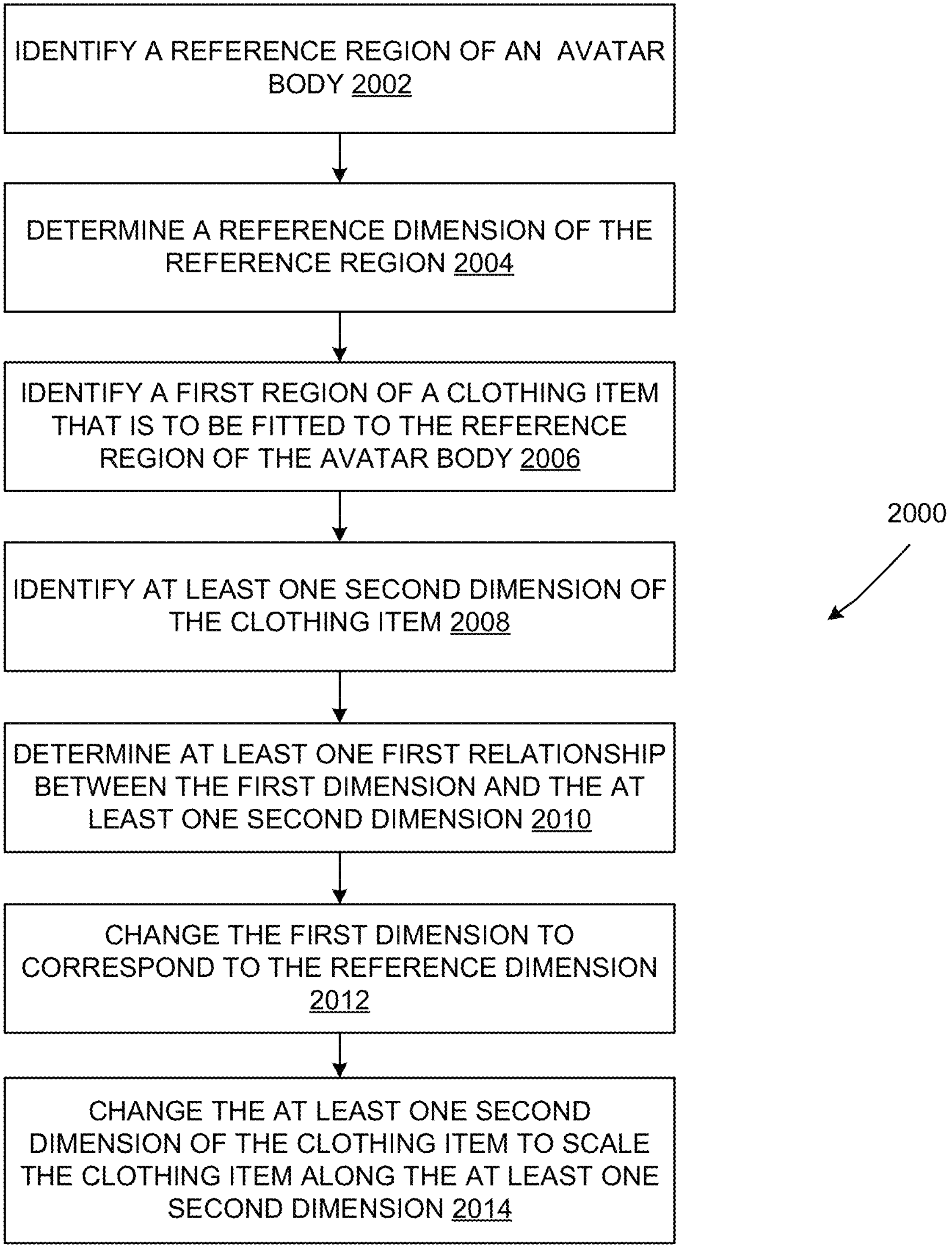
FIG. 20 is a flowchart illustrating a computer-implemented method to provide fitted clothing for 3D avatars, in accordance with some implementations.

FIG. 20—Providing Fitted Clothing for 3D Avatars

FIG. 20 is a flowchart illustrating a computer-implemented method 2000 to provide fitted clothing for 3D avatars, in accordance with some implementations. For the sake of simplicity, the various operations in the method 2000 are described in the context of the virtual experience application 112 at a client device 110 performing the operations. However, and as previously described above with respect to FIG. 1, some of the operations may be performed alternatively or additionally, in whole or in part, by the virtual experience (VE) engine 104 at the virtual experience (VE) server 102.

The example method 2000 may include one or more operations illustrated by one or more blocks, such as blocks 2002 to 2014. The various blocks of the method 2000 and/or of any other process(es) described herein may be combined into fewer blocks, divided into additional blocks, supplemented with further blocks, and/or eliminated based upon the implementation.

The method 2000 of FIG. 20 is explained herein with reference to the elements shown in FIGS. 1-19 and other figures. In one implementation, the operations of the method 2000 may be performed in a pipelined sequential manner. In other implementations, some operations may be performed out-of-order, in parallel, etc.

At block 2002, a reference region of an avatar body is identified. The reference region may be used as one constraint in scaling a clothing item. For a shoe, an example of a reference region of the avatar body is the ankle of the avatar body. Block 2002 may be followed by block 2004.

At block 2004, a dimension of the reference region, such as the diagonal of the ankle for a shoe, is determined. For other types of clothing/accessories (e.g., hats, gloves, watches, shirts, pants, etc.), other reference dimensions may be determined, such as neck circumference, finger length and circumference, wrist circumference, torso width/circumference/height, arm length, ear size, distance between eye pupils, etc. Block 2004 may be followed by block 2006.

At block 2006, a region of a clothing item, such the mouth of the shoe (prior to scaling or other deformation) that is to be fitted to the ankle of the avatar body, is identified. The mouth of the shoe may have a first dimension, such as the length of a diagonal across the mouth of the shoe. For other types of clothing/accessories (e.g., hats, gloves, watches, shirts, pants, etc.), the first region and first dimension an opening of a glove and a diagonal across or a circumference of the opening, the neck opening of a shirt and a diagonal across or the circumference of the opening, the opening or bill of a hat and a diagonal across or a circumference of the opening/bill, etc.

Other values may be used for the first dimension, such as radius, diameter, triangulation or other projection points, etc., which may not necessarily involve a diagonal and instead may be based on some other single- or multi-coordinate (e.g., x, y, z, etc.) computation. Block 2006 may be followed by block 2008.

At block 2008, one or more other dimensions of the clothing item (e.g., a shoe) prior to scaling or other deformation, such as the height, width, toe length, etc. are identified. Block 2008 may be followed by block 2010.

At block 2010, a first relationship (such as a ratio) between the first dimension (e.g., a dimension of the mouth of the shoe, such as the diagonal) and a second dimension (e.g., the height of the shoe) is determined. The relationship may be established/determined via some other technique (alternatively or additionally to a ratio), such as a mathematical formula (other than a basic ratio), interpolation, multiple ratios etc., with or without deviation/adjustment values.

For instance, for five fingers or toes there may be four or other number of ratios. For a wing, there may be a “folded” to “unfolded” ratio. For an arm, there may be a forearm length to elbow-to-shoulder length ratio. These are just some examples that are possible. Block 2010 may be followed by block 2012.

At block 2012, the dimension(s) of the clothing item (e.g., a shoe) are changed so as to fit the mouth of the shoe to the ankle of the avatar, for example via isotropic scaling in the context of a shoe. In some implementations scaling may be performed in a non-isotropic manner, such that some regions of the clothing item may be scaled by some amount and other regions of the clothing item are scaled by some other (different) amount or not scaled at all. Block 2012 may be followed by block 2014.

At block 2014, the clothing item is scaled along the second dimension, such as a shoe being scaled along its height. The first relationship (e.g., ratio) between the first dimension (e.g., the diagonal of the mouth of the shoe) and the at least the second dimension (e.g., the height of the shoe) is maintained (i.e., kept) within a range of values after completion of the scaling. For example, the changing that may occur in block 2012 and block 2014 may include modifying a cage of the clothing item.

One or more further operations, such as scaling the toe length of the shoe, performing tapering, removing distortions, blending, applying user adjustments to the scaling within permissible ranges, etc. may also be performed for the shoe, and analogously for other types of clothing items.

While the method 2000 has been described with reference to an avatar that has a foot with associated dimensions (e.g., ankle dimensions) and a shoe, which is an accessory that has corresponding dimensions (e.g., shoe height, diagonal of a mouth of the shoe, etc.), it may be understood that, in various implementations, the method 2000 may be performed for any avatar with any type of body parts with corresponding dimensions.

For example, an avatar may have other types of body parts (e.g., fins, wings, etc.) or multiple numbers of body parts (e.g., fewer or more limbs, twenty hands, ten feet, three heads, etc.). Further, body parts may be associated with corresponding dimensions (e.g., a length of a forearm; a minimum or maximum circumference of a forearm; a wrist with a wrist circumference; a wing with a folded length and one or more unfolded lengths; or any other type of dimension).

In various implementations, reference dimensions may be one-dimensional (e.g., length, width, circumference, etc.); two dimensional (e.g., area of wing, area of torso, etc.); three-dimensional (e.g., volume of torso, etc.), and corresponding dimensions of the clothing item or accessory that is to be fitted may be used.

With other clothing items or accessories, other reference regions may be identified (e.g., wrist for watches, wristbands, other wrist-worn items, etc.; hand for gloves or other hand-worn items; fingers for rings, etc.; neck for neck-worn items such as scarves, etc.; torso; or any other part of the avatar body. The dimensions for these clothing items and accessories may include a diameter or circumference of the wrist band of the wrist-worn item, a diameter or circumference of the part of a ring that fits over a finger, the length of a bill of a cap, etc.

Figure 21:
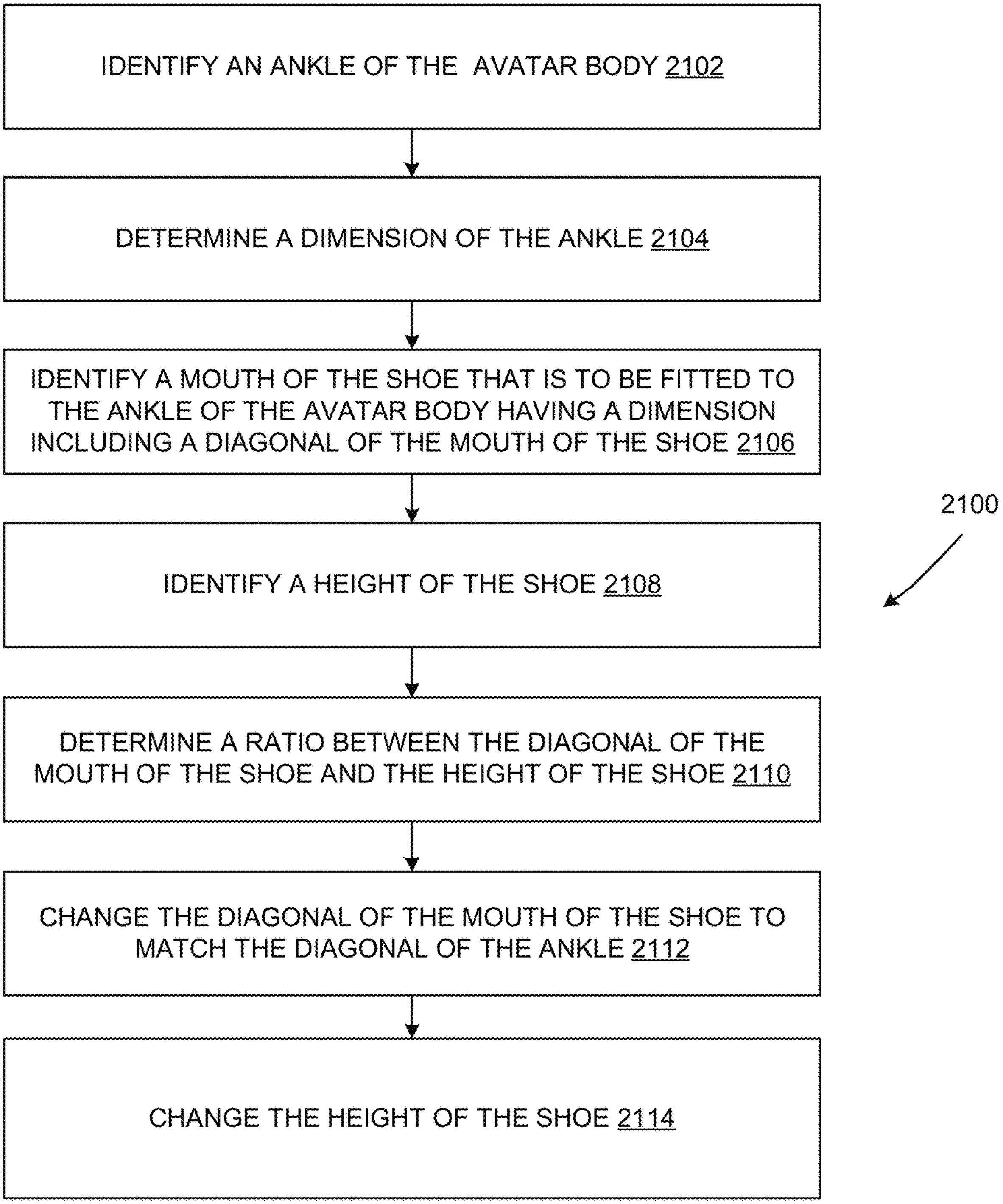
FIG. 21 is a flowchart illustrating a computer-implemented method to provide fitted shoes for 3D avatars, in accordance with some implementations.

FIG. 21—Providing Fitted Shoes for 3D Avatars

FIG. 21 is a flowchart illustrating a computer-implemented method 2100 to provide fitted shoes for 3D avatars, in accordance with some implementations. For the sake of simplicity, the various operations in the method 2100 are described in the context of the virtual experience application 112 at a client device 110 performing the operations. However, and as previously described above with respect to FIG. 1, some of the operations may be performed alternatively or additionally, in whole or in part, by the virtual experience (VE) engine 104 at the virtual experience (VE) server 102.

The example method 2100 may include one or more operations illustrated by one or more blocks, such as blocks 2102 to 2114. The various blocks of the method 2100 and/or of any other process(es) described herein may be combined into fewer blocks, divided into additional blocks, supplemented with further blocks, and/or eliminated based upon the implementation.

The method 2100 of FIG. 21 is explained herein with reference to the elements shown in FIGS. 1-19 and other figures. In one implementation, the operations of the method 2100 may be performed in a pipelined sequential manner. In other implementations, some operations may be performed out-of-order, in parallel, etc.

The operations performed in method 2100 of FIG. 21 correspond to similar operations perform in method 2000 of FIG. 20, but in the specific context of implementations that fit shoes to an avatar.

At block 2102, an ankle of an avatar body may be identified. The reference region (here, the ankle) may be used as one constraint in scaling a clothing item. Thus, for a shoe, an example of a reference region of the avatar body is the ankle of the avatar body. Block 2102 may be followed by block 2104.

At block 2104, a dimension of the diagonal of the ankle for a shoe, may be determined as a reference dimension. Block 2104 may be followed by block 2106.

At block 2106, the mouth of the shoe (prior to scaling or other deformation) that is to be fitted to the ankle of the avatar body, may be identified. The mouth of the shoe may have a first dimension, such as the length of a diagonal across the mouth of the shoe. Block 2106 may be followed by block 2108.

At block 2108, a height of the shoe prior to scaling or other deformation, as a second dimension of the clothing item (the shoe) may be identified. Block 2108 may be followed by block 2110.

At block 2110, a ratio between the diagonal of the mouth of the shoe and the height of the shoe may be determined. The relationship may be established/determined via some other technique (alternatively or additionally to a ratio), such as a mathematical formula (other than a basic ratio), interpolation, multiple ratios etc., with or without deviation/adjustment values. For instance, for five toes there may be four or other number of ratios. Block 2110 may be followed by block 2112.

At block 2112, the diagonal of the mouth of the shoe may be changed so as to fit the mouth of the shoe to the diagonal of the ankle of the avatar, for example via isotropic scaling in the context of a shoe. In some implementations scaling may be performed in a non-isotropic manner, such that some regions of the clothing item (the shoe) may be scaled by some amount and other regions of the clothing item (the shoe) are scaled by some other (different) amount or not scaled at all. Block 2112 may be followed by block 2114.

At block 2114, the height of the shoe may be changed. The first relationship (e.g., ratio) between the first dimension (e.g., the diagonal of the mouth of the shoe) and the at least the second dimension (e.g., the height of the shoe) may be maintained (i.e., kept) in a certain range of values after completion of the scaling.

Figure 22:
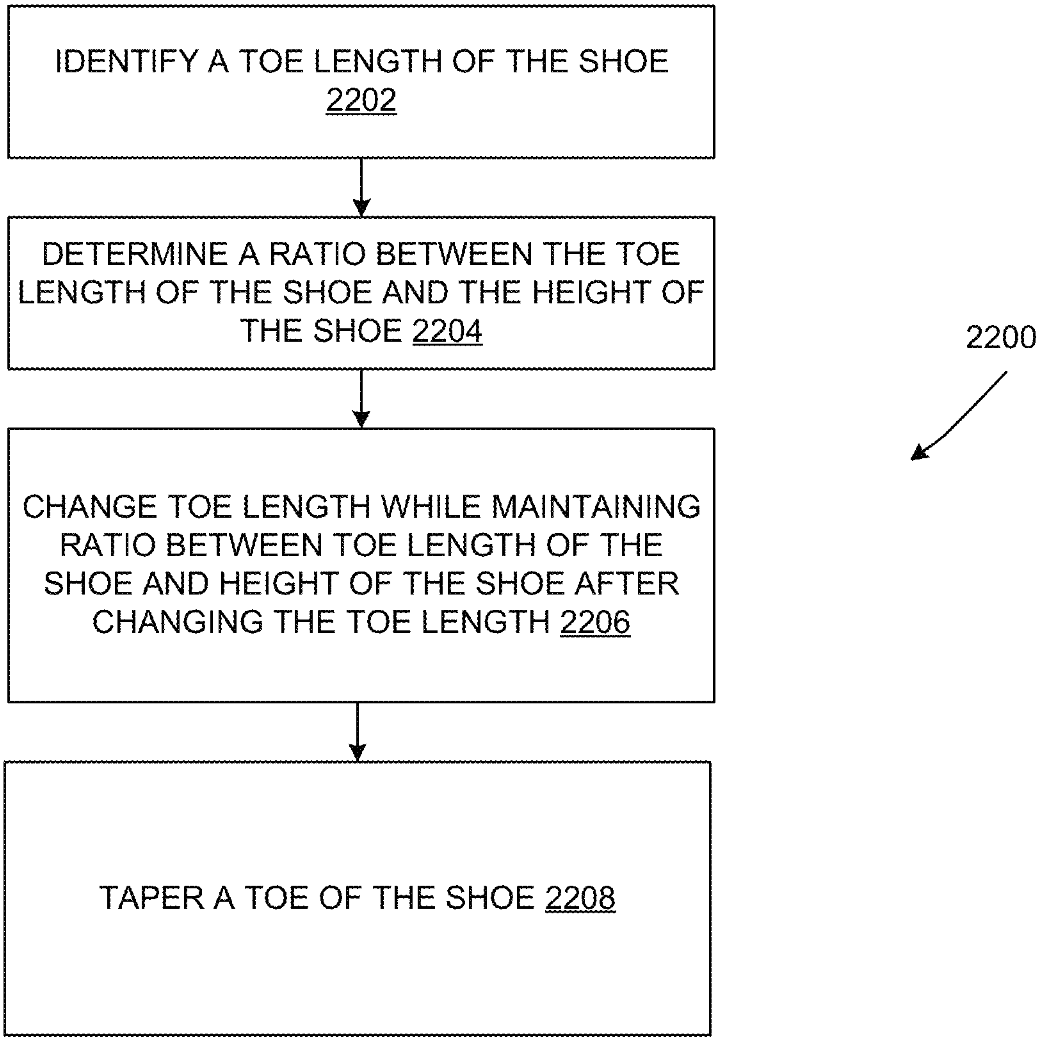
FIG. 22 is a flowchart illustrating an additional computer-implemented method to provide fitted shoes for 3D avatars, in accordance with some implementations.

FIG. 22—Providing Fitted Shoes for 3D Avatars

FIG. 22 is a flowchart illustrating an additional computer-implemented method 2200 to provide fitted shoes for 3D avatars, in accordance with some implementations. For the sake of simplicity, the various operations in the method 2200 are described in the context of the virtual experience application 112 at a client device 110 performing the operations. However, and as previously described above with respect to FIG. 1, some of the operations may be performed alternatively or additionally, in whole or in part, by the virtual experience (VE) engine 104 at the virtual experience (VE) server 102.

The example method 2200 may include one or more operations illustrated by one or more blocks, such as blocks 2202 to 2208. The various blocks of the method 2200 and/or of any other process(es) described herein may be combined into fewer blocks, divided into additional blocks, supplemented with further blocks, and/or eliminated based upon the implementation.

The method 2200 of FIG. 22 is explained herein with reference to the elements shown in FIGS. 1-19 and other figures. In one implementation, the operations of the method 2200 may be performed in a pipelined sequential manner. In other implementations, some operations may be performed out-of-order, in parallel, etc.

At block 2202, a toe length of the shoe is identified. Such a toe length is used subsequently when preserving certain aspect ratios from the original shoe as closely as possible. Block 2202 may be followed by block 2204.

At block 2204, a ratio between the toe length of the shoe and the height of the shoe is determined. Such a ratio is used subsequently when preserving certain aspect ratios from the original shoe as closely as possible. Block 2204 may be followed by 2206.

At block 2206, the toe length of the shoe is changed while maintaining the ratio between the toe length of the shoe and the height of the shoe after changing the toe length. Hence, toe length may be scaled to match the avatar's toe length while being constrained relative to the original toe length, the original height, and the new height. Maintaining this relationship prevents the toe from being crushed more than a default or user-defined amount. Block 2206 may be followed by 2208.

At block 2208, a toe of the shoe is tapered. For example, to improve the shape of the squashed to, a width taper may be applied. Such a width taper may be computed relative to the original toe length and width and the new toe length and width. A magnitude of this taper may also be user-defined. After the tapering, an improved version of the shoe is available.

Figure 23:
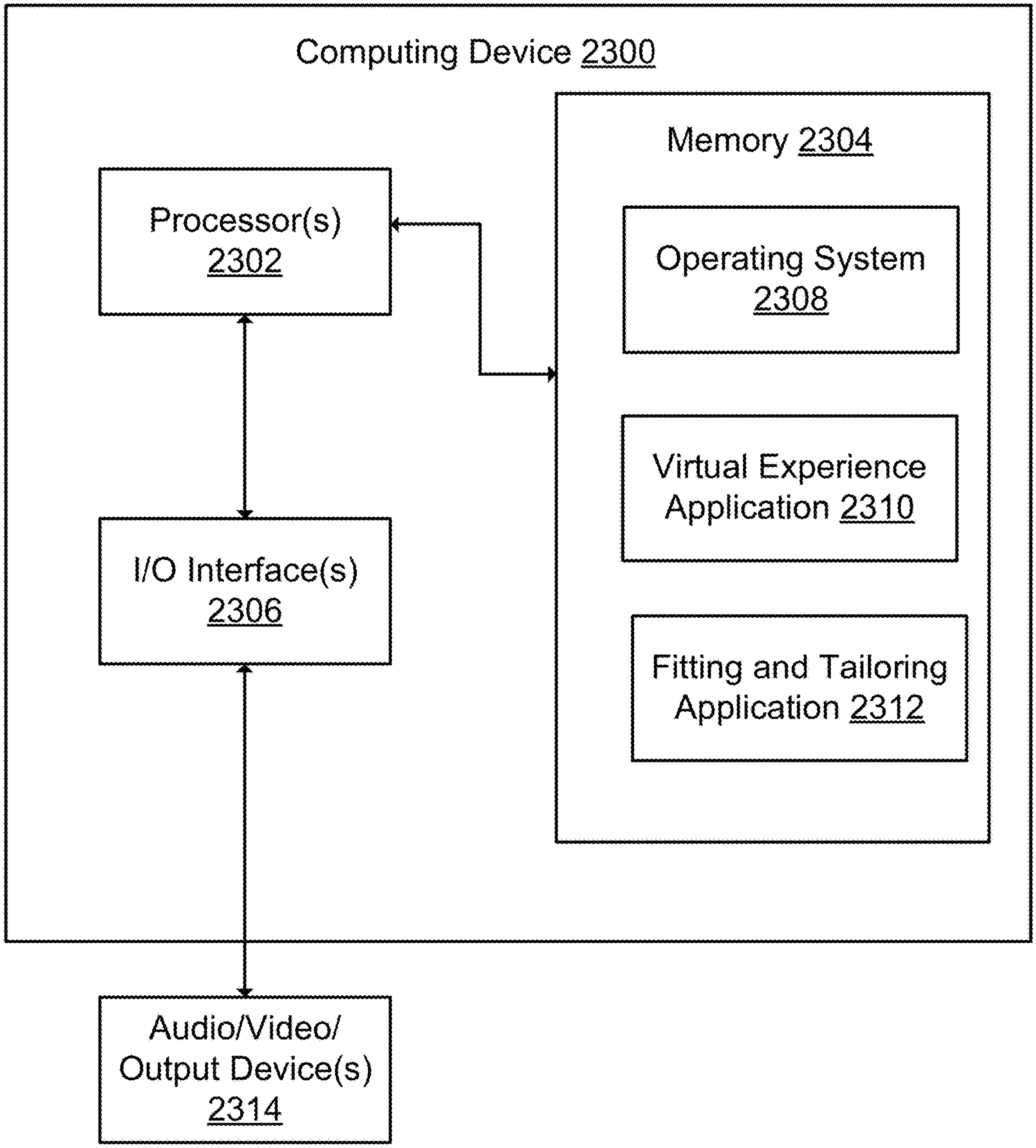
FIG. 23 is a block diagram illustrating an example computing device, in accordance with some implementations.

FIG. 23—Example Computing Device

FIG. 23 is a block diagram illustrating an example computing device 2300, in accordance with some implementations.

FIG. 23 is a block diagram of an example computing device 2300 which may be used to implement one or more features described herein. In one example, computing device 2300 may be used to implement a computer device (e.g., 102 and/or 110 of FIG. 1), and perform appropriate method implementations described herein. Computing device 2300 can be any suitable computer system, server, or other electronic or hardware device. For example, the computing device 2300 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, computing device

2300 includes a processor 2302, a memory 2304, input/output (I/O) interface 2306, and audio/video input/output devices 2314.

Processor 2302 can be one or more processors and/or processing circuits to execute program code and control basic operations of the computing device 2300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing require not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 2304 is typically provided in computing device 2300 for access by the processor 2302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 2302 and/or integrated therewith. Memory 2304 can store software operating on the computing device 2300 by the processor 2302, including an operating system 2308, virtual experience application 2310, a fitting and tailoring application 2312, and other applications (not shown). In some implementations, application 2310 and/or application 2312 can include instructions that enable processor 2302 to perform the functions (or control the functions of) described herein, e.g., some or all of the methods described with respect to FIGS. 20, 21, and 22.

For example, applications 2310 can include a fitting and tailoring application 2312, which as described herein can fit and tailor clothing to avatars within an online virtual experience server (e.g., 102). Elements of software in memory 2304 can alternatively be stored on any other suitable storage location or computer-readable medium. In addition, memory 2304 (and/or other connected storage device(s)) can store instructions and data used in the features described herein. Memory 2304 and any other type of storage (magnetic disk, optical disk, magnetic tape, or other tangible media) can be considered "storage" or "storage devices."

I/O interface 2306 can provide functions to enable interfacing the computing device 2300 with other systems and devices. For example, network communication devices, storage devices (e.g., memory and/or data store 120), and input/output devices can communicate via interface 2306. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 2314 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 23 shows one block for each of processor 2302, memory 2304, I/O interface 2306, and software blocks of operating system 2308, virtual experience application 2310, and fitting and tailoring application 2312. These blocks may represent one or more processors or processing circuitries, operating systems, memories, I/O interfaces, applications, and/or software engines. In other implementations, computing device 2300 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the computing device 2300, e.g., processor(s) 2302, memory 2304, and I/O interface 2306. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 2314, for example, can be connected to (or included in) the computing device 2300 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 2000, 2100, and/or 2200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method to provide fitted clothing on three-dimensional (3D) avatars, the method comprising:

identifying a reference region of an avatar body of an avatar;

determining a reference dimension of the reference region of the avatar body;

identifying a first region of a clothing item that is to be fitted to the reference region of the avatar body, wherein the first region has a first dimension;

identifying at least one second dimension of the clothing item;

determining at least one first relationship between the first dimension and the at least one second dimension, wherein the at least one first relationship comprises a ratio, an interpolation, multiple ratios, or any combination thereof;

changing the first dimension to correspond to the reference dimension of the reference region of the avatar body so as to fit the first region of the clothing item to the reference region of the avatar body, wherein changing the first dimension correspondingly causes a scaling in size of the clothing item; and changing the at least one second dimension of the clothing item to scale the clothing item along the at least one second dimension, wherein the at least one first relationship between the first dimension and the at least one second dimension is maintained after completion of the changing of the at least one second dimension.

2. The computer-implemented method of claim 1, wherein:

the clothing item comprises a shoe;

identifying the reference region of the avatar body comprises identifying an ankle of the avatar body;

determining the reference dimension of the reference region of the avatar body comprises determining a diagonal of the ankle;

identifying the first region of the clothing item that is to be fitted to the reference region of the avatar body comprises identifying a mouth of the shoe that is to be fitted to the ankle of the avatar body, wherein the first dimension comprises a diagonal of the mouth of the shoe;

identifying the at least one second dimension of the clothing item comprises identifying a height of the shoe;

determining the at least one first relationship between the first dimension and the at least one second dimension comprises determining a ratio between the diagonal of the mouth of the shoe and the height of the shoe;

changing the first dimension to correspond to the reference dimension of the reference region of the avatar body comprises changing the diagonal of the mouth of the shoe to match the diagonal of the ankle; and changing the at least one second dimension of the clothing item to scale the clothing item along the at least one second dimension comprises changing the height of the shoe.

3. The computer-implemented method of claim 2, wherein:

identifying the at least one second dimension of the clothing item further comprises identifying a toe length of the shoe;

determining the at least one first relationship further comprises determining a ratio between the toe length of the shoe and the height of the shoe; and changing the at least one second dimension of the clothing item to scale the clothing item along the at least one second dimension comprises changing the toe length, wherein the ratio between the toe length of the shoe and the height of the shoe is maintained after completion of the changing of the toe length.

4. The computer-implemented method of claim 3, further comprising performing a tapering of a toe of the shoe, wherein the tapering is based at least in part on an original toe length and an original width of the shoe prior to changing the first dimension and changing the at least one second dimension.

5. The computer-implemented method of claim 1, wherein the at least one first relationship comprises a ratio between the first dimension and the at least one second dimension, the ratio being within a predetermined range of values.

6. The computer-implemented method of claim 1, wherein changing the first dimension and the at least one second dimension of the clothing item comprises modifying a cage of the clothing item.

7. A non-transitory computer-readable medium with instructions stored thereon that, responsive to execution by a processing device, cause the processing device to perform operations comprising:

identifying a reference region of an avatar body of an avatar;

determining a reference dimension of the reference region of the avatar body;

identifying a first region of a clothing item that is to be fitted to the reference region of the avatar body, wherein the first region has a first dimension;

identifying at least one second dimension of the clothing item;

determining at least one first relationship between the first dimension and the at least one second dimension, wherein the at least one first relationship comprises a ratio, an interpolation, multiple ratios, or any combination thereof;

changing the first dimension to correspond to the reference dimension of the reference region of the avatar body so as to fit the first region of the clothing item to the reference region of the avatar body, wherein changing the first dimension correspondingly causes a scaling in size of the clothing item; and changing the at least one second dimension of the clothing item to scale the clothing item along the at least one second dimension, wherein the at least one first relationship between the first dimension and the at least one second dimension is maintained after completion of the changing of the at least one second dimension.

8. The non-transitory computer-readable medium of claim 7, wherein:

the clothing item comprises a shoe;

identifying the reference region of the avatar body comprises identifying an ankle of the avatar body;

determining the reference dimension of the reference region of the avatar body comprises determining a diagonal of the ankle;

identifying the first region of the clothing item that is to be fitted to the reference region of the avatar body comprises identifying a mouth of the shoe that is to be fitted to the ankle of the avatar body, wherein the first dimension comprises a diagonal of the mouth of the shoe;

identifying the at least one second dimension of the clothing item comprises identifying a height of the shoe;

determining the at least one first relationship between the first dimension and the at least one second dimension comprises determining a ratio between the diagonal of the mouth of the shoe and the height of the shoe;

changing the first dimension to correspond to the reference dimension of the reference region of the avatar body comprises changing the diagonal of the mouth of the shoe to match the diagonal of the ankle; and changing the at least one second dimension of the clothing item to scale the clothing item along the at least one second dimension comprises changing the height of the shoe.

9. The non-transitory computer-readable medium of claim 8, wherein:

identifying the at least one second dimension of the clothing item further comprises identifying a toe length of the shoe;

determining the at least one first relationship further comprises determining a ratio between the toe length of the shoe and the height of the shoe; and changing the at least one second dimension of the clothing item to scale the clothing item along the at least one second dimension comprises changing the toe length, wherein the ratio between the toe length of the shoe and the height of the shoe is maintained after completion of the changing of the toe length.

10. The non-transitory computer-readable medium of claim 9, the operations further comprising performing a tapering of a toe of the shoe, wherein the tapering is based at least in part on an original toe length and an original width of the shoe prior to changing the first dimension and changing the at least one second dimension.

11. The non-transitory computer-readable medium of claim 7, wherein the at least one first relationship comprises a ratio between the first dimension and the at least one second dimension, the ratio being within a predetermined range of values.

12. The non-transitory computer-readable medium of claim 7, wherein changing the first dimension and the at least one second dimension of the clothing item comprises modifying a cage of the clothing item.

13. A system comprising:

a memory with instructions stored thereon; and a processing device, coupled to the memory, the processing device configured to access the memory and execute the instructions, wherein the instructions cause the processing device to perform operations comprising:

identifying a reference region of an avatar body of an avatar;

determining a reference dimension of the reference region of the avatar body;

identifying a first region of a clothing item that is to be fitted to the reference region of the avatar body, wherein the first region has a first dimension;

identifying at least one second dimension of the clothing item;

determining at least one first relationship between the first dimension and the at least one second dimension, wherein the at least one first relationship comprises a ratio, an interpolation, multiple ratios, or any combination thereof;

changing the first dimension to correspond to the reference dimension of the reference region of the avatar body so as to fit the first region of the clothing item to the reference region of the avatar body, wherein changing the first dimension correspondingly causes a scaling in size of the clothing item; and changing the at least one second dimension of the clothing item to scale the clothing item along the at least one second dimension, wherein the at least one first relationship between the first dimension and the at least one second dimension is maintained after completion of the changing of the at least one second dimension.

14. The system of claim 13, wherein:

the clothing item comprises a shoe;

identifying the reference region of the avatar body comprises identifying an ankle of the avatar body;

determining the reference dimension of the reference region of the avatar body comprises determining a diagonal of the ankle;

identifying the first region of the clothing item that is to be fitted to the reference region of the avatar body comprises identifying a mouth of the shoe that is to be fitted to the ankle of the avatar body, wherein the first dimension comprises a diagonal of the mouth of the shoe;

identifying the at least one second dimension of the clothing item comprises identifying a height of the shoe;

determining the at least one first relationship between the first dimension and the at least one second dimension comprises determining a ratio between the diagonal of the mouth of the shoe and the height of the shoe;

changing the first dimension to correspond to the reference dimension of the reference region of the avatar body comprises changing the diagonal of the mouth of the shoe to match the diagonal of the ankle; and changing the at least one second dimension of the clothing item to scale the clothing item along the at least one second dimension comprises changing the height of the shoe.

15. The system of claim 14, wherein:

identifying the at least one second dimension of the clothing item further comprises identifying a toe length of the shoe;

determining the at least one first relationship further comprises determining a ratio between the toe length of the shoe and the height of the shoe; and changing the at least one second dimension of the clothing item to scale the clothing item along the at least one second dimension comprises changing the toe length, wherein the ratio between the toe length of the shoe and the height of the shoe is maintained after completion of the changing of the toe length.

16. The system of claim 15, the operations further comprising performing a tapering of a toe of the shoe, wherein the tapering is based at least in part on an original toe length and an original width of the shoe prior to changing the first dimension and changing the at least one second dimension.

17. The system of claim 13, wherein the at least one first relationship comprises a ratio between the first dimension and the at least one second dimension, the ratio being within a predetermined range of values.

* * * * *